United States Patent Office 3,436,779
Patented Apr. 8, 1969

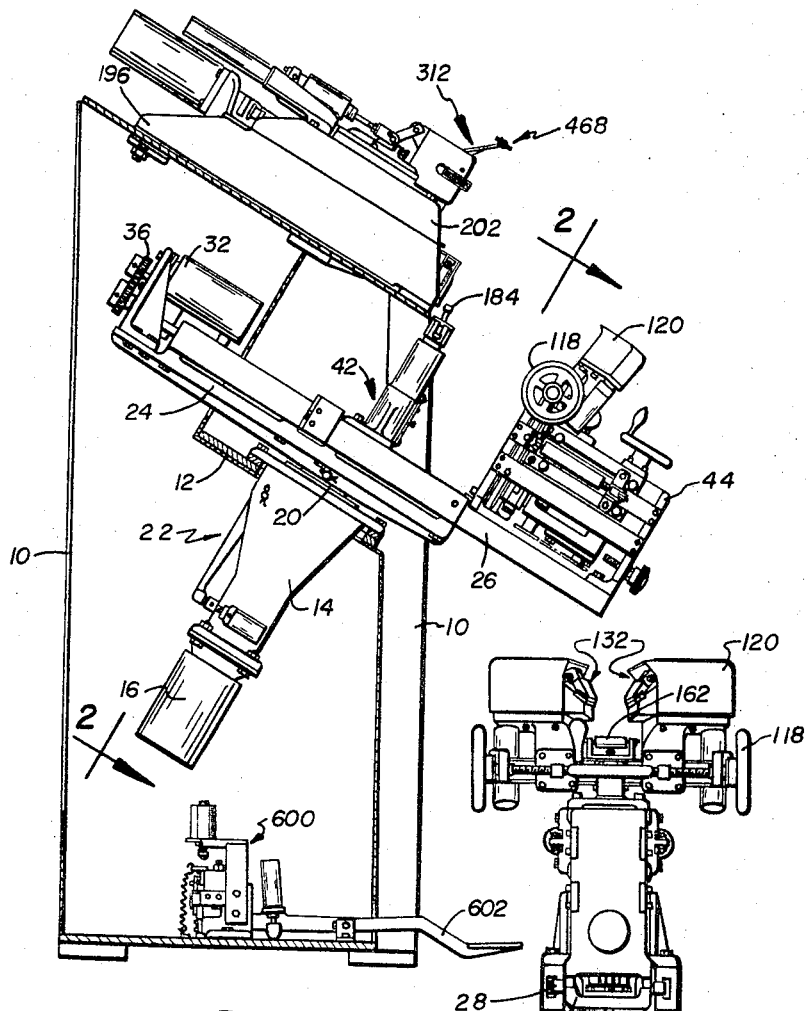
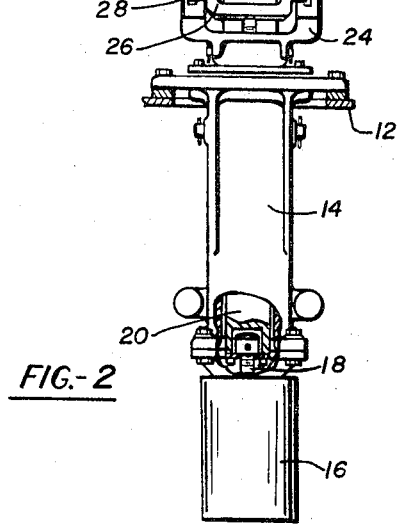
FIG.-1
FIG.-2

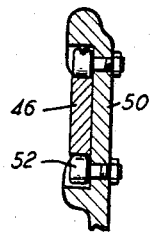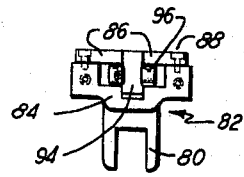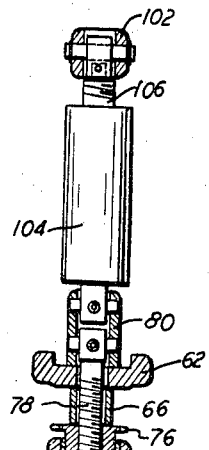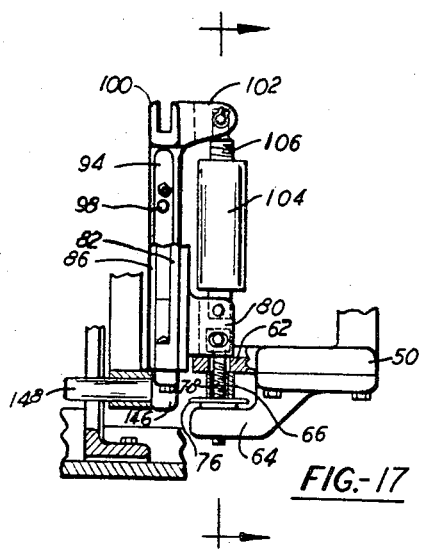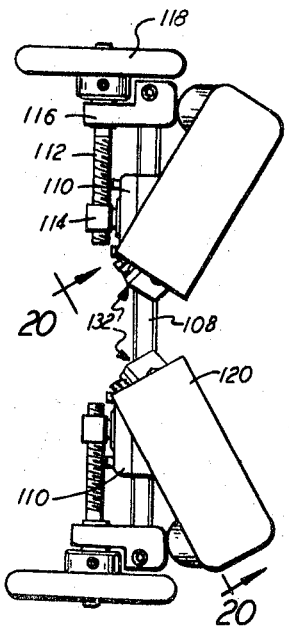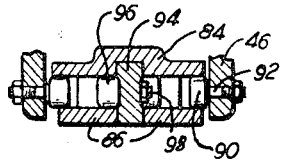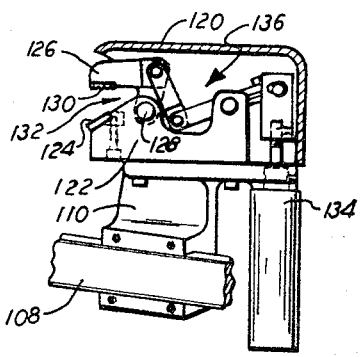

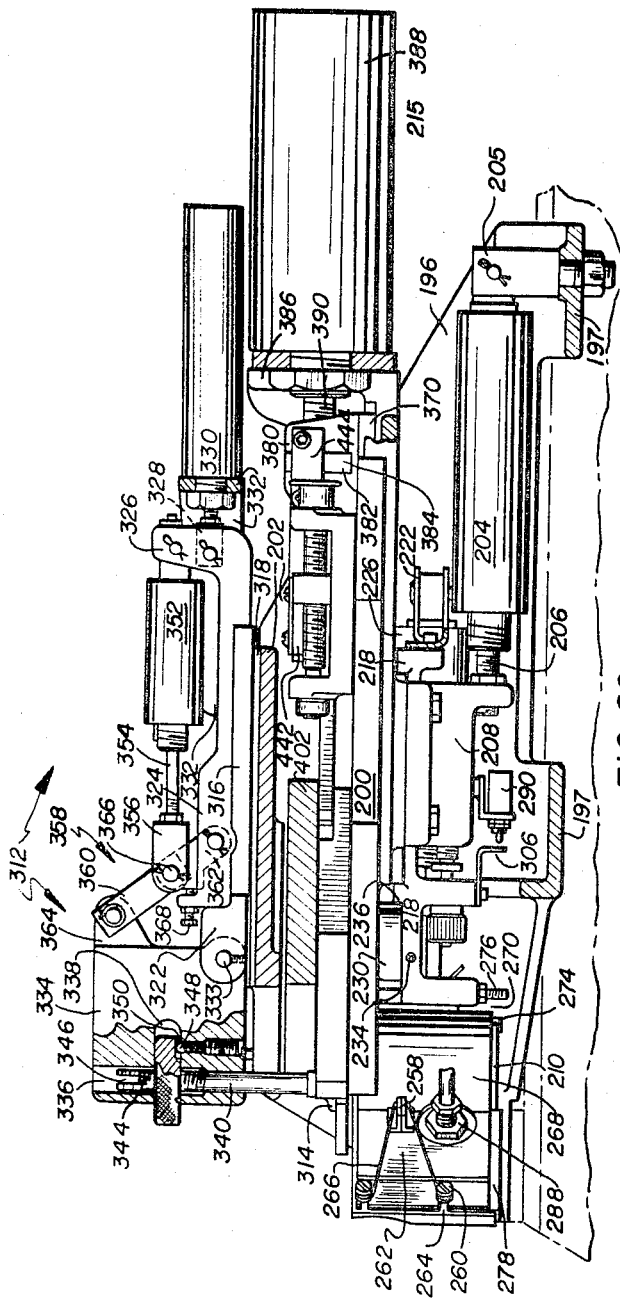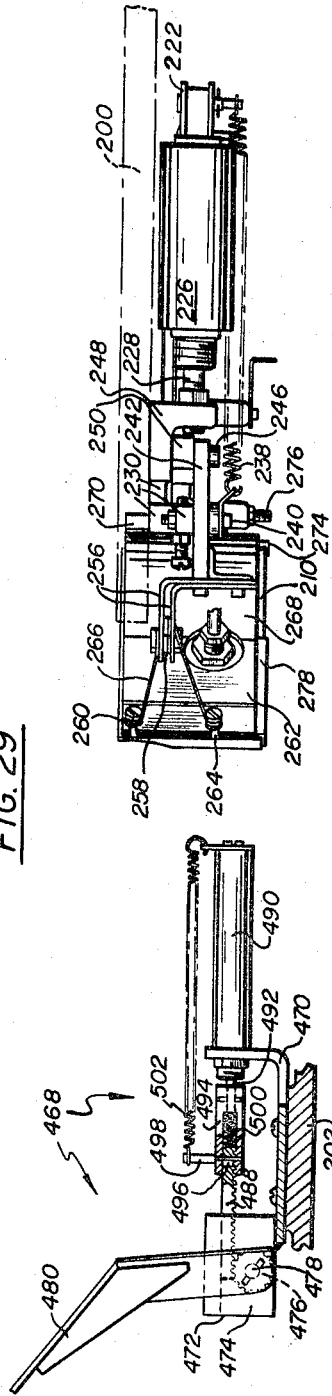

3,436,779
HEEL SEAT LASTING
Horst M. Leonhardt, Randolph, Mass., assignor to
Jacob S. Kamborian, Boston, Mass.
Filed Aug. 9, 1965, Ser. No. 478,185
Int. Cl. A43d *21/00, 3/00*
U.S. Cl. 12—10.5                                    24 Claims

ABSTRACT OF THE DISCLOSURE

The instant disclosure is concerned with a heel seat lasting machine in which provision is made for tightly stretching the heel end of a shoe upper about a last having an insole located on the bottom thereof and thereafter wiping the margin of the upper to the insole. An end clamp is provided to clamp the upper to the heel end of the last prior to the wiping operation. Gaging means, included in the machine facilitate manipulation of the upper to its proper position on the last by the operator. Also disclosed is a last support having an inclined last pin.

---

This invention relates to the performance of various operations on a shoe during its manufacture. It is intended to be an improvement over the subject matter disclosed in pending United States application Ser. No. 353,462 filed Mar. 20, 1964 and pending United States application Ser. No. 432,515 filed Feb. 15, 1965.

Among the objects of the instant invention are:

To provide an improved but simple device for supporting a last;

To provide an apparatus which is useful in orienting a shoe upper with respect to a shoe insole to thereby insure that the finished shoe will have been lasted evenly; and to provide an improved apparatus for clamping the heel portion of a shoe upper against the heel portion of a last in such a manner as to insure that the upper will precisely conform to the shape of the last.

Other objects and advantages of the present invention will become apparent from the following description including the accompanying drawings wherein:

FIGURE 1 is a side elevation of the machine;

FIGURE 2 is a view taken of the line 2—2 of FIGURE 1 and is partly broken away to show the post and its connections;

FIGURE 14 is a view taken along the line 14—14 of FIGURE 10;

FIGURE 15 is a view taken along the line 15—15 of FIGURE 13;

FIGURE 16 is a view taken along the line 16—16 of FIGURE 17;

FIGURE 17 is a side elevation of the mechanism in the framework for imparting upward motion to the pincers;

FIGURE 18 is a view taken along the line 18—18 of FIGURE 13;

FIGURE 19 is a top view of the pincers and the mechanism to adjust them;

FIGURE 20 is a view taken along the line 20—20 of FIGURE 19;

FIGURE 29 is a side elevation, partially in section, of the heel clamping, holddown and wiping mechanisms;

FIGURE 30 is a side elevation, partially in section, of the gage mechanism;

FIGURE 31 is a side elevation of the heel clamping mechanism;

Figure 3:
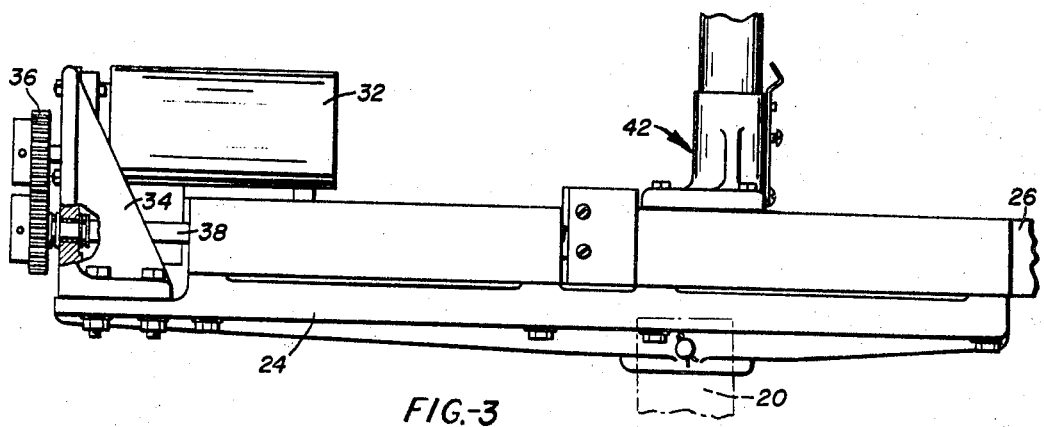
FIGURE 3 is a side elevation of the platform.

The machine has a frame to which an upright post is mounted, the post having freedom of motion both in an axial and a rotational direction with respect to its longitudinal axis. A platform is fixed to the uppermost end of the post. A shoe supporting mechanism is mounted to the platform and a shoe upper stretching mechanism is slidably mounted to the forward end of the platform for motion in a direction towards and away from the shoe supporting mechanism, so that the platform, shoe supporting mechanism and shoe upper stretching mechanism may have motion unitary with that of the post and the shoe upper stretching mechanism may also have motion independent of the post. In operation, at last having an insole temporarily fixed to its bottom and a shoe upper draped thereabout is placed on the shoe supporting mechanism in a "bottom up" and "toe forward" position so that the forepart of the shoe upper may be gripped and stretched by the shoe upper stretching mechanism. During this stretching action the last is subjected to a clamping action between the shoe supporting mechanism and the holddown mechanism mounted to the frame and directly above the shoe supporting mechanism. This is accomplished by maintaining the holddown mechanism in a fixed position and raising the post, thereby raising the last and its attendant shoe parts, until the insole on the last is in firm abutment with the holddown mechanism. The holddown mechanism is initially in a rearward position where it will not interfere with the placement of the shoe assembly on the shoe supporting mechanism and is moved to a forward working position above the shoe assembly before the post is raised.

Also mounted to the frame for slidable motion from an initial rearward position to a forward working position is a plate having wipers mounted thereon and a heel clamp mounted to its forward end. After the shoe upper stretching mechanism has performed its respective functions, the plate moves forward so that the heel clamp may grip the heel portion of the shoe assembly to insure that the heel portion of the upper will conform tightly to the shape of the last. This gripping action is aided by further mechanism carried by the plate and later described in detail.

The wiping of the shoe upper to the insole begins when the heel clamp has fully gripped the heel portion of the shoe assembly. A mechanism also carried by the plate imparts a compound motion to the wipers such that they initially have both forward translatory motion and inwardly swinging motion over the heel of the shoe assembly with the forward translatory motion decreasing and the inwardly swinging motion increasing as the wipers complete their stroke. A control is provided that is actuable toward the end of the inwardly swinging movement of the wipers to raise the holddown mechanism and increase the upward pressure of the post so that the bottom of the shoe assembly is forced upwardly against the wiper bottoms with increased pressure, hereinafter referred to as "bedding pressure."

The shoe upper stretching mechanism releases its grip on the shoe upper when the wipers are in operation.

The various instrumentalities in the machine are operated by fluid actuated motors, a control mechanism being provided to operate them in a predetermined sequence.

Figure 37:
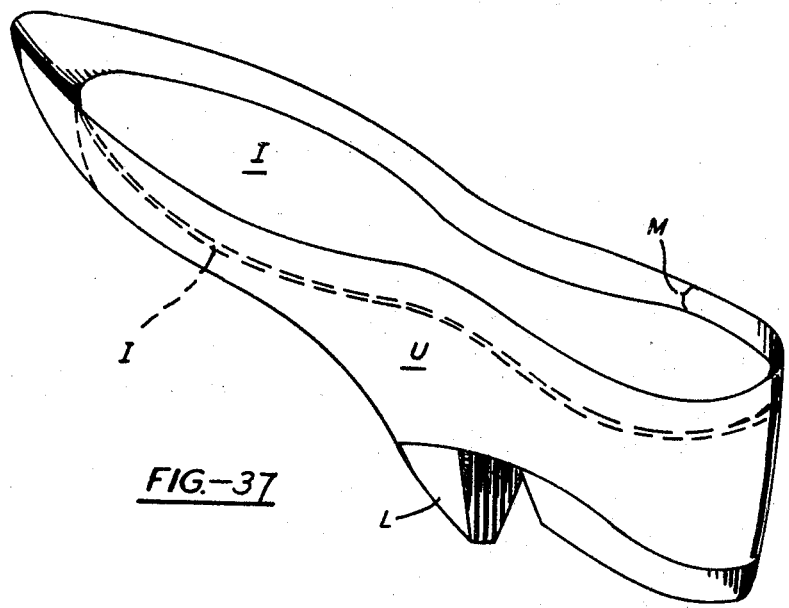
FIGURE 37 is an illustration of a shoe assembly in loosely assembled condition preparatory to placement into the machine.
Figure 38:
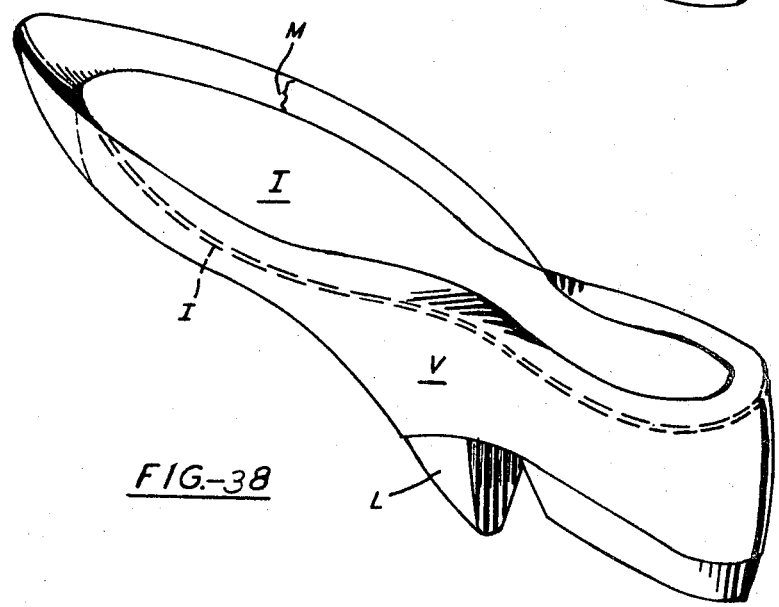
FIGURE 38 is an illustration of a shoe which has been heel seat lasted in the machine.

Referring to FIGURE 37, it may be seen that the shoe assembly, as presented to the machine, is in a bottom-up position and comprises a last L, and insole I located on the bottom of the last L and an upper U draped about the last L and having portion thereof extending beyond the surface of the insole I which will hereinafter be referred to as the upper margin M. The ultimate objective of the machine is to last the heel portion of the margin M to the insole, as shown in FIGURE 38.

The machine is also provided with a gage mechanism which is of aid to the operator in positioning the upper U on the last L so that the upper margin M will extend a uniform distance beyond the surface of the insole I. Such uniformity of the upper margin M is desirable in that when the margin is subsequently wiped against the insole, an evenly lasted shoe, as shown in FIGURE 38, and hence a better shoe, will be produced.

At some time prior to the wiping of the margin M to the insole I, a bead of suitable adhesive is placed on that portion of the insole to which the upper margin M will be lasted, so that upon wiping, the insole I and upper margin M may be permanently bonded together.

Referring to FIGURE 1, the machine has a frame 10 to which is mounted a base 12. The base 12 and the various components mounted thereto are inclined at an angle of about 30 degrees to the horizontal to facilitate accessibility of the machine to the operator. Depending from the base 12 is a housing 14. For ease of explanation, the direction of the base 12 will be referred to as horizontal and the direction of the housing 14 will be referred to as vertical. In operating the machine, the operator stands to the right of the machine as shown in FIGURE 1 and motion towards the operator (left to right in FIGURE 1) will be described as forward while motion away from the operator (right to left in FIGURE 1) will be described as rearward.

As disclosed in pending application Ser. No. 353,462 filed Mar. 20, 1964, an air operated motor 16 is secured to the lower end of the housing 14 and has a piston rod 18 extending upwardly into the interior of the housing 14 (see FIGURE 2). The upper end of the piston rod 18 is connected to the lower end of the post 20. The post 20 is mounted in the housing 14 in such a manner as to permit both axial and rotary motion about its longitudinal axis. The upper end of the post protrudes beyond the upper end of the housing 14. The connection between the piston rod 18 and the post 20 is such that the post may be rotated about its longitudinal axis without any interference between them. Brake means 22 (partially shown in FIGURE 1 and more fully disclosed in United States application Ser. No. 353,462 filed Mar. 20, 1964) is operatively associated with the post 20 to prevent further rotational movement of the post once its desired angular position has been effected.

Figure 4:
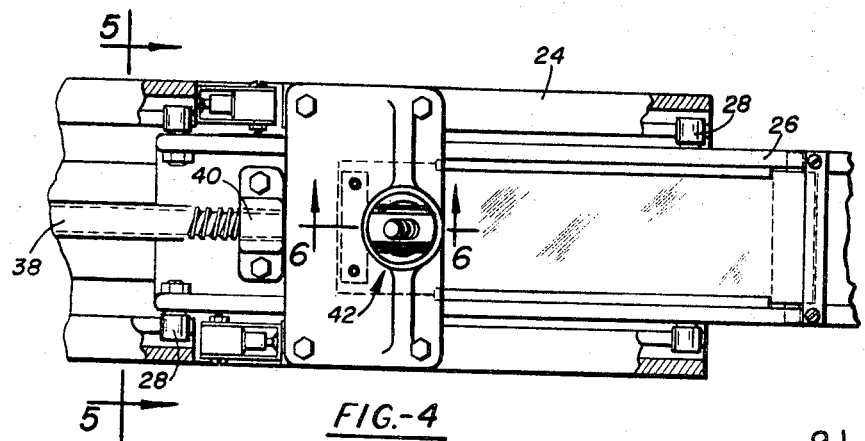
FIGURE 4 is a top view of the channel-shaped platform and the base moveable therein.
Figure 5:
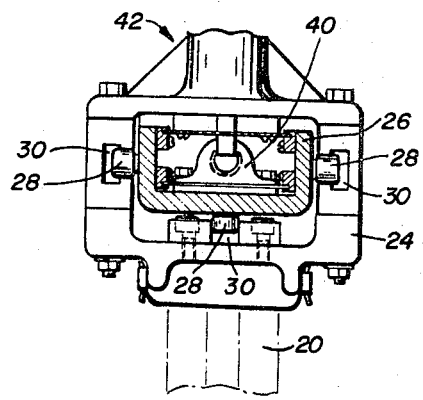
FIGURE 5 is a sectional view taken along the line 5—5 of FIGURE 4.
Figure 6:
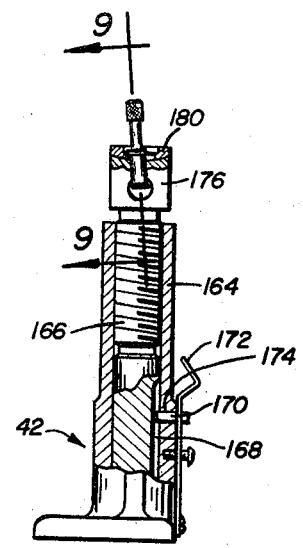
FIGURE 6 is a partially sectional view of the pedestal taken along the line 6—6 of FIGURE 4.

A channel-shaped platform 24 (FIGURES 3 and 4) is connected to the protruding upper end of the post 20 for vertical and swingable movement therewith. The workpiece (a last having an insole and an unlasted upper draped thereon) is positioned and supported at its heel end and at its toe end by components mounted to the platform 24 so that motion imparted in the post 20 and platform 24 will be transmitted to the workpiece. A base 26 is mounted on the platform 24 for horizontal rearward and forward motion by means of rollers 28 affixed to the base 26 and moveable in the tracks 30 formed in the platform 24. Movement of the base 26 is effected by cooperation of a reversible motor 32 mounted to the rear of the platform 24 by means of a bracket 34 and a gear train 36 which connects the motor 32 to a shaft 38, the rear end of which is also rotatably mounted to the bracket 34. The forward end of the shaft 38 is threadably engaged with a nut 40 that is secured to the base 26. Rotation of the motor 32 will cause rotation of the shaft 38 and thereby move the base 26 forwardly or rearwardly depending on the direction of rotation of the motor 32. Rigidly mounted to and rising vertically from the platform 24 is a pedestal 42 upon which the heel portion of the workpiece is supported. It is later described in detail.

Figure 10:
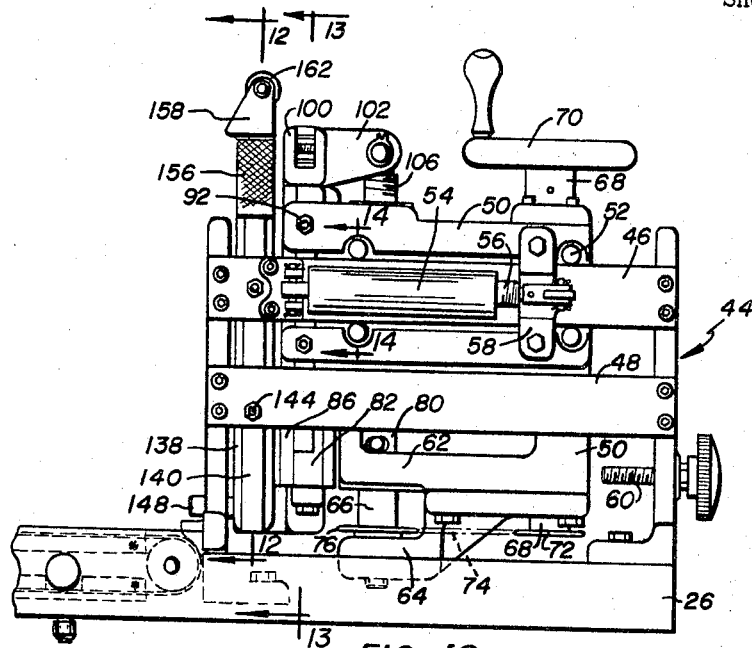
FIGURE 10 is a side elevation of the horizontal stretch carriage.
Figure 11:
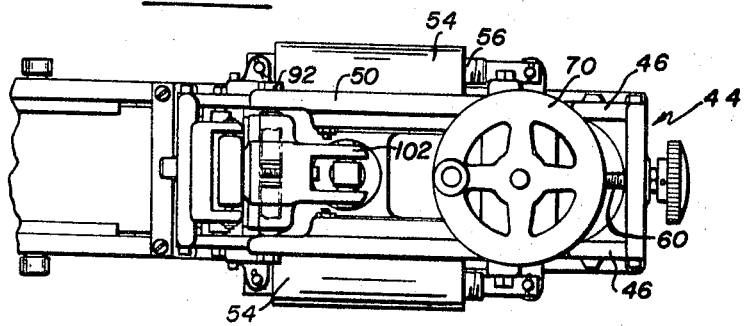
FIGURE 11 is a top view of the horizontal stretch carriage.

Referring to FIGURES 10 and 11, the front of the base 26 has a framework 44 extending upwardly thereof to which is mounted a shoe upper stretching mechanism, the function of which is to stretch the upper U tightly about the last prior to the wiping operation. The framework 44 includes an upper horizontally extending bar 46 and a lower horizontally extending bar 48 on each side. A horizontal stretch carriage 50, located between the bars 46 and 48, has rollers 52 rotatably mounted thereon that are in engagement with the tops and bottoms of the bars 46 (FIGURE 14) so as to support the carriage 50 on the bars for forward and rearward horizontal movement. An air actuated motor 54 is pivotally connected to each bar 46 and each motor 54 has a piston rod 56 that is connected to the horizontal stretch carriage 50 by means of a bracket 58. A screw 60, threaded into the framework 44, serves as an adjustable stop to limit the extent of forward movement of the carriage 50 under the influence of the motors 54.

Figure 13:
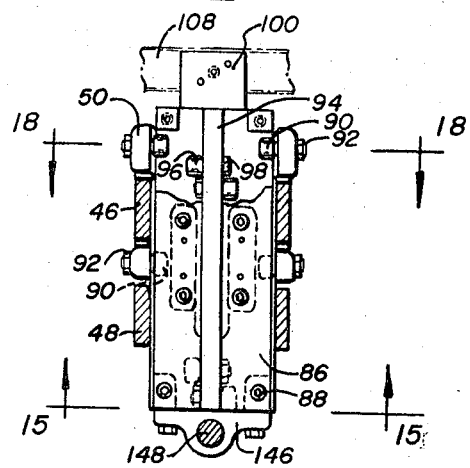
FIGURE 13 is a sectional view taken along the line 13—13 of FIGURE 10.

The carriage 50 carries mechanism for supporting the forepart of a shoe assembly and a mechanism for gripping the forward portion of a shoe upper. The gripping mechanism is moveable in a vertical direction for the purpose of stretching the shoe upper vertically and horizontal stretching of the shoe upper may be accomplished by moving the entire carriage 50 in a forward direction. As shown in FIGURES 16 and 17, the carriage 50 includes a pair of depending vertically spaced flanges 62 and 64 that are separated by a spacer sleeve 66. A shaft 68, rotatably mounted in the carriage 50 (FIGURE 10), has a handle 70 secured to its upper end and a sprocket 72 secured to its lower end. The sprocket 72 is connected by way of an endless chain 74 to another sprocket 76 that is rotatably mounted in the flange 64. A stud 78 is threaded into the sprocket 76 and extends upwardly thereof through the sleeve 66 and the flange 62 so that rotation of the sprocket 76 will impart vertical motion to the stud 78. The top of the stud 78 is pinned to a clevis extension 80 formed on a column 82 (FIGURE 15). It is by this column 82 that the gripping mechanism is supported. The column 82 is comprised of a strut 84 and a pair of plates 86 that are secured to the strut at its corners by bolts 88. The strut 84 and the plates 86 define a pair of vertically extending channels that receive rollers 90 which are rotatably mounted on pins 92 (FIGURES 13 and 18) which are in turn secured to the carriage 50, so that the rollers 90 may guide the column 82 for vertical movement in the carriage 50. The strut 84 and the plates 86 also define a vertical guideway for a bar 94 that is slidably guided by rollers 96 mounted to pins 98 located on the bar 94 with the rollers 96 extending into the opening between the strut 84 and the plates 86. (FIGURES 13, 15 and 18). The top of the bar 94 is formed into a cup 100 (FIGURE 17) having a clevis 102 extending forwardly thereof. An air actuated motor 104 is pinned to the clevis 80 to extend upwardly thereof and the piston rod 106 of the motor 104 is pinned to the clevis 102 so that activation of the motor 104 causes the bar 94 to be raised or lowered.

As shown in FIGURES 13, 19 and 20 a bar 108 is secured in the cup 100 and extends laterally thereof on both sides. A slide 110 is moveably mounted on the bar 108 on each side of the cup 100. The position of each slide 110 on the bar 108 may be adjusted by rotating a stud 112 that is threaded into a nut 114 which is secured to each of the slides 110. The studs are rotatably mounted in flanges 116 that are secured to the opposite ends of the bar 108, and a handle 118 is affixed to the outer end of each stud 112 to facilitate their rotation. Each slide 110 has a pincers housing 120 secured thereto. A block 122, secured to each housing 120 has a stationary pincer jaw 124 thereon. A lever 126 that is pivotally connected to each block 122 by means of a pin 128, has a moveable pincers jaw 130 thereon. The pincers jaws 124 and 130 form what is hereinafter referred to as pincers 132. The pincers 132 are actuated by an air operated motor 134 secured to the housing 120 which activates a connecting linkage 136 as described in the aforementioned pending application Ser. No. 353,462 filed Mar. 20, 1964. From the above it may be seen that the stretching of a shoe upper in a vertical direction may be accomplished by gripping the upper in the pincers 132 and activating the air motor 104 which raises the bar 94 which in turn raises the pincers 132, the bar being guided by the channel formed in the column 82.

Figure 12:
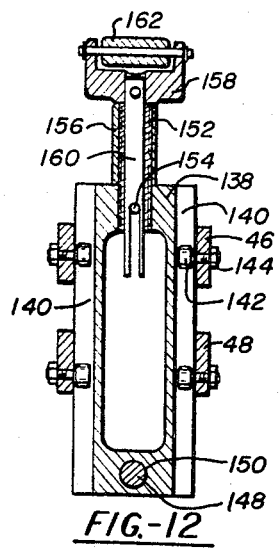
FIGURE 12 is a sectional view taken along the line 12—12 of FIGURE 10.

A mechanism for supporting the forepart of a shoe assembly is also mounted to the framework 44. A pillar 138 (FIGURES 10 and 12) is mounted for vertical movement in the framework 44 rearwardly of the column 82 by means of vertical slots 140 formed in the pillar 138 which contain rollers 142, the rollers 142 being mounted on pins 144 that are secured to the bars 46 and 48. The column 82 (see FIGURES 13 and 17) has a cap 146 bolted to its bottom and a prong 148 is secured to the cap 146, the prong 148 extending rearwardly to become slidably associate with a hole 150 formed in the bottom of the pillar 138. Thus, vertical motion of the column 82 may be transferred to the pillar 138. The hollow nut 152 is threaded into the top of the pillar 138 and is secured thereto by a pin 154. A collar 156 is threaded onto that portion of the nut 152 that rises above the pillar 138, and a bracket 158 rests on the collar 156, the bracket having a shank 160 pinned thereto and extending downwardly into the hollow of the nut 152. The lower end of the shank 160 is forked to straddle the pin 154 so that rotational movement of the shank 160 and the bracket 158 is prevented. Rotatably mounted to the bracket 158 is a toe rest roller 162 on which the forepart of the shoe assembly rests directly.

From the above it can be seen that rotation of the handle 70 acts to adjust in unison the vertical position of the pincers 132 and the toe rest roller 162 and a manipulation of the collar 156 on the nut 152 acts to adjust the vertical position of the toe rest roller 162 independently of the pincers 132. These adjustments may be made to adapt the machine for shoes of varying shapes and styles although it has been found that it is frequently unnecessary to change the vertical distance between the toe rest roller 162 and the pincers 132, the only adjustment required being that of raising the toe rest roller and the pincers in unison by rotating the handle 70. It may also be seen from the above description that actuation of the motors 54 acts to move the pincers 132 horizontally with the prong 148 sliding in the hole 150 formed in the pillar 138 and that actuation of the motor 104 acts to move the pincers 132 vertically. The pillar 138 and toe rest roller 162 do not move in response to actuation of the motors 54 and 104. Thus the manipulation of the collar 156 serves to adjust the vertical distance between the toe rest roller 162 and the pincers 132 and the rotation of the handle 70 serves to change the elevation of the toe rest roller and the pincers while maintaining their vertical distance.

Figure 8:
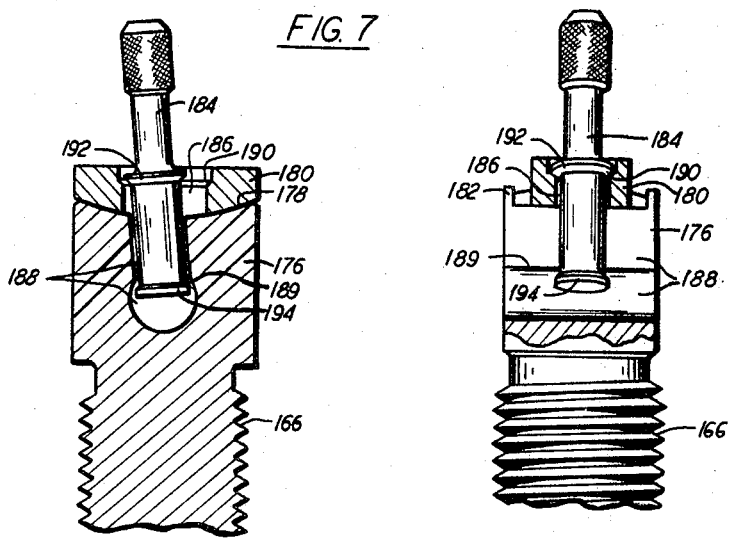
FIGURE 8 is an enlarged view of the crown and last pin as shown in FIGURE 6.
Figure 9:
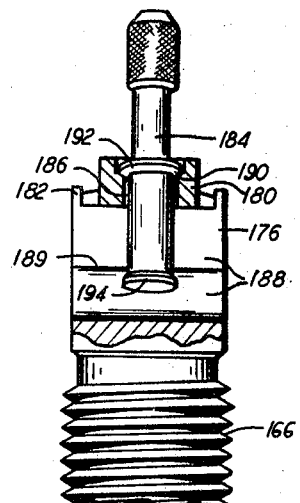
FIGURE 9 is a partially sectional view taken along the line 9—9 of FIGURE 6.

The workpiece is supported at its heel end by a pedestal 42 which is rigidly mounted to the platform 24 (FIGURES 1, 3, 4 and 6) forwardly of the post 20. The pedestal consists of an upwardly extending tubular portion 164 which contains, in threaded engagement, a column 166 so that the vertical position of the column 166 may be varied by rotating it within the tubular portion 164. This adjustment may be made for the purpose of accommodating the machine to operate on different sizes and styles of shoes. The lower, unthreaded portion of the column 166 has a vertical groove 168 formed at its periphery for accommodation of a pin 170 so that when the pin 170 is in the groove 168 rotation of the column 166 is precluded. The pin 170 is normally urged into the groove 168 by means of a leaf spring 172 to which it is affixed. The leaf spring 172 is mounted to the outside of the tubular portion 164 and a hole 174 is provided in the tubular portion 164 to permit passage of the pin 170 therethrough. When adjusting the vertical position of the column 166, the leaf spring 172 may be retracted, thereby withdrawing the pin 170 form the groove 168 and permitting rotation of the column 166. The upper end of the column 166 is formed into a crown 176 (FIGURES 8 and 9) having a concave cylindrical upper surface 178 for cradle-like accommodation of a shoe assembly supporting plate 180. The shoe assembly supporting plate 180 has a convex cylindrical lower surface complemental to the concave upper surface 178 of the crown 176. Thus the shoe assembly supporting plate 180 may rock forwardly and rearwardly as well as slide laterally on the crown 176. The extent of lateral motion of the shoe assembly supporting plate 180 on the crown 176 is limited by a pair of shoulders 182 formed as an integral part of the crown 176 and located at the lateral extremities thereof. The foregoing freedom of motion of the shoe assembly supporting plate 180 permits self-alignment thereof with respect to a last supported thereon, regardless of the shape of the last or the misalignment of the last pin hole, so that the top of the shoe assembly supporting plate 180 is flush with the supported portion of the last. A last pin 184 is loosely mounted to the crown 176 and extends upwardly through an oval shaped hole 186 in the shoe assembly support plate 180, the major axis of the hole 186 being along a forward-rearward line so that the shoe assembly supporting plate 180 may rock on the crown 176 without interference from the last pin 184. The crown 176 has a transverse slot 188 formed therethrough, the lower portion of the slot 188 being larger size than the upper portion, thereby forming a restriction 189 at their junction. The slot 188 is rearwardly inclined with respect to the longitudinal axis of the column 166 for reasons later described.

The oval-shaped hole 186 has a shoulder 190 formed therein. Integrally formed on the last pin 184 are a pair of axially spaced peripheral collars 192 and 194, the collar 192 being of greater diameter than the collar 194. The shoulder 190 is of such a size as to permit the collar 194 to pass through the oval shaped hole 186 but to prevent the passing of the collar 192 therethrough so that the last pin 184 may be supported on the shoulder 190 of the shoe assembly support plate 180 by means of its engagement with the collar 192. The collar 194 is of a size intermediate that of the upper and lower portions of the transverse slot 188 of the crown 176. In assembly, the shoe assembly supporting plate 180 with last pin 184 suspended therefrom is inserted laterally into the transverse slot 188. The distance by which the collars 192 and 194 are spaced must be at least enough to permit the shoe assembly supporting plate 180 to clear the shoulder 182 when the collar 194 is in abutment with the restriction 189. Once assembled to the crown 176, the last pin 184 will depend into the slot 188 with a clearance present between the restriction 189 and the collar 194. The width of the upper portion of the transverse slot 188 is such that the last pin 184 may have lateral motion but no substantial forward or rearward motion. In the foregoing manner, last pins and shoe assembly supporting plates may be interchanged for accommodation of different size lasts.

It has been found that in stretching the upper about the last in a forward and horizontal direction, there is a tendency for the last to lift off from the shoe assembly supporting plate 180 and slide up the last pin 184. This undesirable characteristic is particularly noticeable when the last pin hole is out of alignment with the last or when the surface of the last pin hole has become deformed through wear. The instant apparatus overcomes this problem by mounting the last pin 184 so that it is rearwardly inclined. The transverse slot 188 into which the last pin 184 depends is so inclined for the purpose of positioning the last pin.

Figure 25:
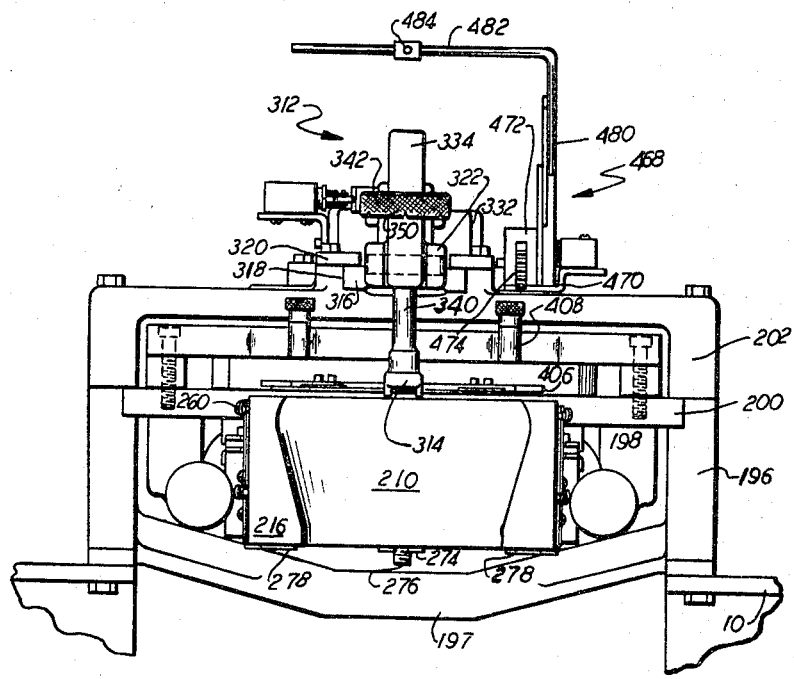
FIGURE 25 is a front view of the head and the mechanisms mounted thereto.

Referring to FIGURES 1 and 25, a head 196 having cross arm 197 is mounted on the frame 10 above and rearwardly of the framework 44 and the pedestal 42. Mounted about the head 196 are mechanisms which aid the operator in positioning the shoe upper on the last, clamp the last to the shoe assembly supporting plate 180 to insure rigidity of the last during subsequent operations, clamp the heel portion of the upper to the last to insure that the shape of the finished shoe will conform to that of the last and wipe the upper margin M against the heel portion of the insole. A guideway 198 is formed in the head 196 for slidable accommodation of a main slide plate 200. A head cover 202 is bolted to the head 196 and is spaced above the main slide plate 200. The primary function of the main slide plate 200 is to carry the mechanisms mounted thereto from a rearward, out of the way position to a forward working position. This is accomplished by means of a fluid operated motor 204 (FIGURES 22 and 29) one end of which is pivotally mounted to a clevis 205 that is secured to the rear cross arm 197, the other end of the motor 204 having a piston rod 206 secured to a bracket 208 depending from the main slide plate 200.

Figure 34:
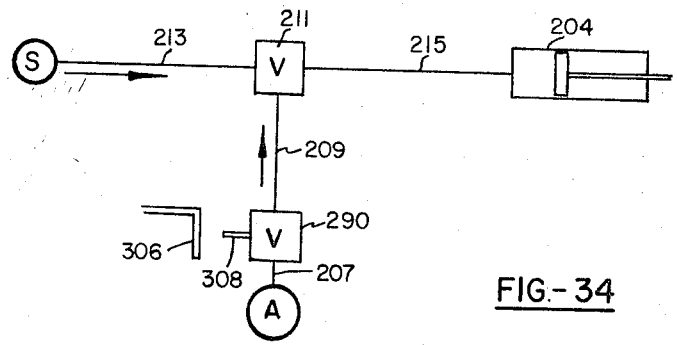
FIGURE 34 is a schematic representation of that portion of the control circuit which locks the main slide plate in forward position.

When the main slide plate 200 has been brought to a forward working position, it is essential that it be locked in place to prevent subsequent rearward motion when the mechanisms carried thereon are performing their respective functions. With this end in view, the motor 204 is operated by oil as opposed to air. Referring to the schematic diagram of FIGURE 34, oil, or other relatively incompressible fluid, is introduced from a source S, to the line 213, passes through the valve 211, line 215 and into the head end of the motor 204, thereby imparting forward motion to the main slide plate 200. The valve 211 is air operated and is normally in an open position to permit oil to flow from the source S to the motor 204. When the main slide plate 200 has reached its most forward position, the plunger 308 (see also FIGURES 22 and 29) of the valve 290 abuts the stop 306 (in a manner later described) which permits compressed air to flow from a source A, through line 207, through valve 290, and line 209 thereby causing the valve 211 to shift from its normally open position to a closed position, thereby precluding a return flow of oil from the motor 204 to the source S and hence rearward motion of the main slide plate 200. As will be later described, valve 290 also serves to activate other motors. Thus activation of the motor 204 will cause the main slide plate 200 and the mechanisms carried thereon to slide forwardly or rearwardly in the guideways 198.

Figure 26:
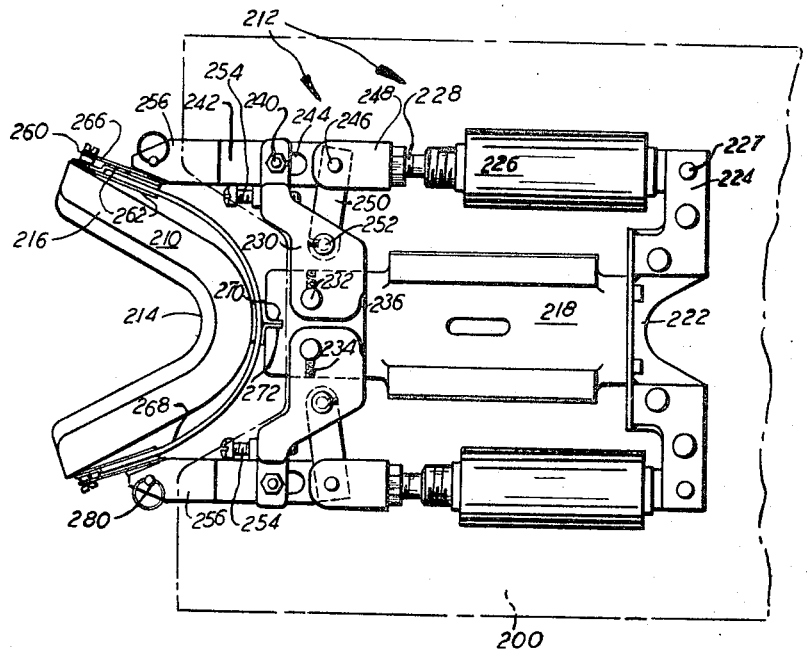
FIGURE 26 is a top view of the heel clamp mechanism.

To insure that the finished shoe will conform to the shape of the last L, the upper U must be pressed tightly to the last before and during the wiping of the upper margin M to the insole I. This is accomplished by means of a heel clamp pad 210 (FIGURES 26 and 32) formed from a yieldable material such as rubber. The heel clamp pad 210 is mounted to the forward end of a heel clamp mechanism 212 which in turn is mounted to the underside of the main slide plate 200 in such a manner (described below) that as the main slide plate 200 moves forwardly the bight 214 of the heel clamp pad 210 will contact the heel portion of the shoe assembly whereupon the heel clamp mechanism 212 will become activated to further stretch the legs 216 of the heel clamp pad 210 in a forward direction and then force the legs 216 inwardly towards the shoe assembly (as shown by the solid lines in FIGURE 32) to clamp the shoe upper U tightly against the last.

The advantages of this type of heel clamp pad motion are disclosed in United States application Ser. No. 432,515 filed Feb. 15, 1965, wherefrom it may be seen that the inner walls of the pad legs 216 initially engage the heel portions of the upper in regions that extend in the direction of the toe from the heel end extremity of the upper and press these portions against the last. The motion of the pad is such that the pad legs 216 are stretched in a forward heel to toe direction thereby tending to push the engaged portions of the upper away from the heel as well as forcing the engaged upper portions inwardly against the last to thereby further stretch the heel portion of the upper about the heel portion of the last. The pad legs 216 thus press the engaged upper portion in directions that are substantially normal to the longitudinal center line of the last to insure that the upper is tightly pressed against the last particularly in the reentrant portions of the last indicated by the letter R in FIGURE 32. During the aforesaid movements of the pad 210, the backing strip 268 resists the outwardly directed pressures of the pad and thus enhances the inwardly directed forces applied by the pad.

Figure 7:
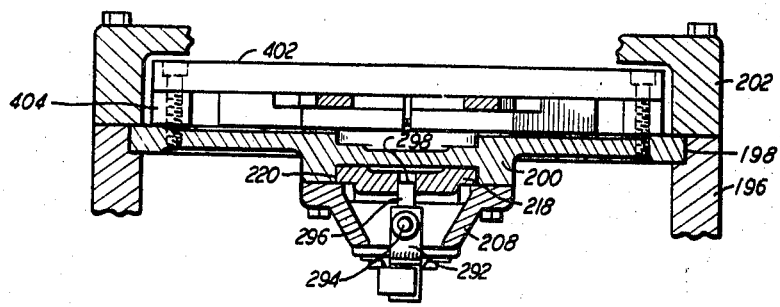
FIGURE 7 is a sectional view of the main slide plate and its attendant members taken along the line 7—7 of FIGURE 28.

The heel clamp mechanism 212 consists of a heel clamp slide 218 which is slidably mounted below the main slide plate 200 in guideways 220 (FIGURE 7) formed between the bracket 208 and the main slide plate 200. Mounted to the rear of the heel clamp slide 218 is a bracket 222 (FIGURE 26) having pair of laterally extending arms 224. An air actuated motor 226 is pivoted to each of the arms 224 on pins 227. Each motor 226 has a piston rod 228 which operates that portion of the heel clamp mechanism 212 which imparts the desired forward stretching and inward swing motion to the legs 216.

Figure 21:
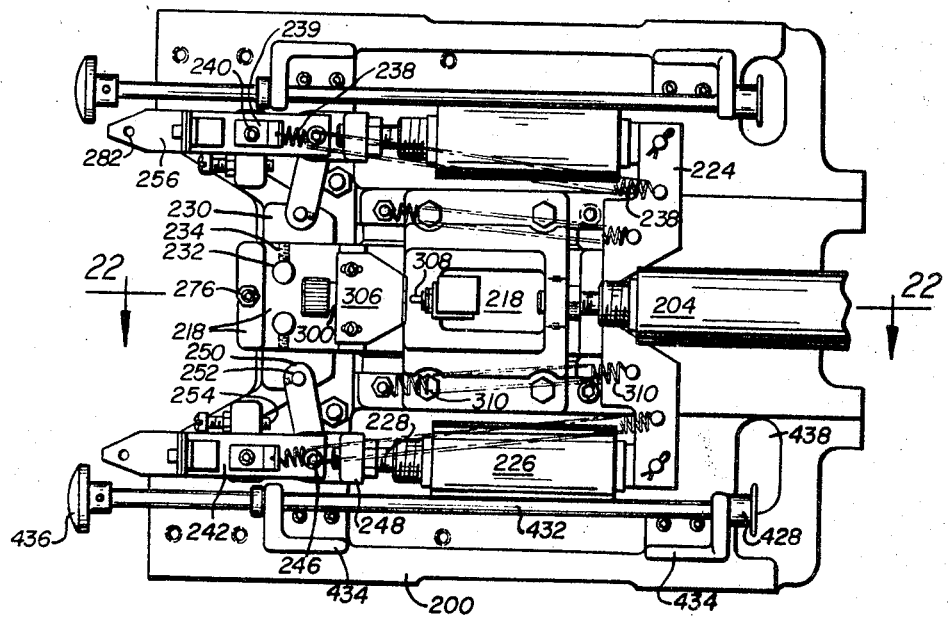
FIGURE 21 is a bottom view of the heel clamp mechanism as seen from a point thereunder.

A pair of arms 230 (FIGURES 21, 26 and 31) are pivotally mounted to pins 232 which are secured to the forward end of the heel clamp slide 218 by means of set screws 234. A shoulder 236 is provided on the heel clamp slide 218 rearwardly of the pins 232 to limit the extent that the arms 230 may pivot in a rearward direction. When at rest, the arms 230 are maintained in abutment to the shoulder 236 by means of tension springs 238 which have one end thereof connected to the arms 224 of the bracket 222 and the other end connected to the clips 239 that are rigidly fastened to the outer extremities of the arms 230 by pins 240. A pair of sliding links 242 having longitudinal slots 244 formed at their midportions are pivotally connected by means of pins 246 to angle brackets 248, the angle brackets 248 being rigidly fastened to the piston rods 228 of the air motors 226. The links 242 are also moveably connected to the arms 230 by means of engagement of the slots 244 and the pins 240 so that activation of the motors 226 to cause the piston rods 228 to move forwardly (to the left in FIG. 26) will cause the links 242 to have substantially linear forward motion, being guided by the pins 240. During the forward motion of the links 242 the pins 240 and consequently the arms 230 are rigidly maintained in a rearward position by means of the tension springs 238. Another link 250 is pivotally mounted at one end to each of the arms 230 by means of pins 252 which are secured to the arms 230 at their midportion. The other end of each link 250 is pivotally mounted to the pin 246 so that as the motors 226 impart substantially forward motion to the links 242, rotary motion about the pins 252 will be simultaneously imparted to the links 250. A bolt 254 is threaded into each arm 230 in such a manner that it is in registry with the plane of rotation of the links 250 so that as the links 250 rotate in response to actuation of the motors 226 they will abut the rearward ends of the bolts 254 thereby terminating the substantially forward linear motion of the links 242 and cause the arm 230, the link 242 and the link 250 to become rigid with respect to each other. When such a relative rigid relationship occurs, further actuation of the motors 226 to cause further forward motion of the piston rods 228 will cause the arms 230, the links 242 and the links 250 to rotate, as rigid units, about the pins 232, overcoming the tension of the springs 238 with the motors 226 swinging about the axes of the pins 227.

The time at which the arms 230 and links 242, 250 rigidify to thereby terminate the substantially forward motion of the links 242 may be varied by varying the proximity of the stop bolts 254 to the links 250, such termination being relatively early when the stop bolts 254 are screwed towards the links 250 and being relatively late when the stop bolts 254 are screwed away from the link 250. The latest time at which the substantially forward motion of the links 242 can terminate will occur when the stop bolts 254 are retracted from the links 250 an amount sufficient to permit the pins 240 to come into abutment with the most rearward ends of the slots 244 prior to abutment of the stop bolts 254 with links 250, thereby rendering the stop bolts 254 ineffectual.

Mounted to and extending forwardly from each of the links 242 are a pair of vertically spaced plates 256 (FIGURE 31) which cooperate with lugs 258 (FIGURE 29) that extend from the heel clamp pad 210 in a manner described below. Secured to the outside of each of the legs 216 are a pair of vertically spaced studs 260. A pair of vertical plates 262 having their forward ends abuttingly secured together and their rearward ends horizontally spaced, have horizontal slots 264 formed at their forward abutting ends for accommodation of the studs 260. The lugs 258 are secured to each of the outer plates 262 and the plates 262 are urged forwardly against the studs 260 by means of a spring 266 (FIGURE 29) which is fastened to the studs 260 and bent around the lug 258. A heel band 268 formed from a relatively non-yieldable material is confined at its ends in the space formed between the rearward portions of the plates 262 and is secured thereto. The heel band 268 surrounds the rearward portion of the resilient heel clamp pad 210 for a purpose later described. Mounted to and extending rearwardly from the bight of the heel band 268 is a positioning lug 270 (see FIGURE 22) which is slidably contained in a vertical slot 272 formed in the forward end of the heel clamp slide 218. The bottom of the lug 270 has a forwardly extending shelf 274 upon which rests the rearward-most portion of the heel clamp pad 210. A bolt 276 is threaded upwardly into the slot 272 and supports the positioning lug 270 so that vertical adjustment of the bolt 276 also adjusts the vertical elevation of the bight 214 of the heel clamp pad 210 and the heel band 268. Additional support for the heel clamp pad 210 is provided at the forward portions of the legs 216 by inwardly extending shelves 278 which are formed as an integral part of the plates 262. Thus it may be seen that the heel clamp pad 210, heel band 268, plates 262, lugs 258 and 270, and springs 266 form a unit that may be mounted to or removed from the apparatus as a whole. The mounting of the above described unit is accomplished by cooperation of the lugs 258, the spaced plates 256 and a pin 280 whereby a hole 282 is formed in each of the plates with a corresponding hole (not shown) being formed in each of the lugs 258, so that the lugs 258 may be inserted between the vertically spaced plates 256 and the pin 280 may be inserted into the hole 282 in the plates 256 and the corresponding hole in the lugs 258. A ring 284 may be attached to the pin 280 for the purpose of facilitating removal.

Figure 33:
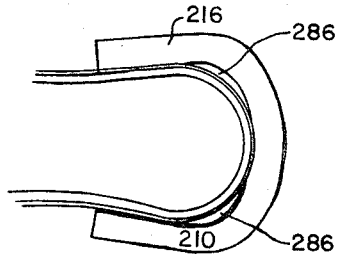
FIGURE 33 is a plan view of the heel end of the shoe with the heel clamp in improper engagement therewith.
Figure 34A:
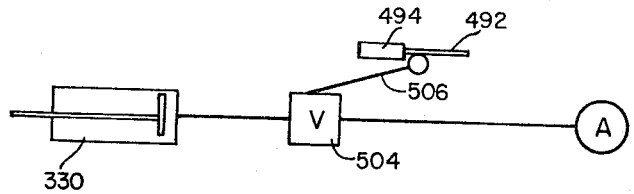
FIGURE 34A is a schematic representation of that portion of the control circuit which maintains the holddown mechanism in an out-of-the-way position during operation of the gage mechanism.

In the operation of the heel clamping mechanism 212 it has been found that the clamping of the upper U to the heel portion of the last L was imperfect when the heel clamp pad 210 was used without aid of the heel band 268 in that as the legs 216 of the heel clamp pad 216 were swung inwardly a space 286 (FIGURE 33) would result between the upper and the heel clamp pad 210. The heel band 268, being formed from a relatively non-stretchable material, is drawn tightly around the heel clamp pad 210 when its forward ends are swung inwardly, thus exerting a further clamping force on the heel clamp pad 210 and preventing the heel clamp pad 210 from drawing away from the upper as shown in FIGURE 33. An additional clamping force is provided in that the heel clamp pad 210 has a hollow inflatable interior, more fully disclosed in United States application Ser. No. 432,515 filed Feb. 15, 1965 and is so inflated after the pad is in full contact with the shoe assembly. A fitting 288 communicates compressed air from a suitable source to the interior of the heel clamp pad 210.

Figure 22:
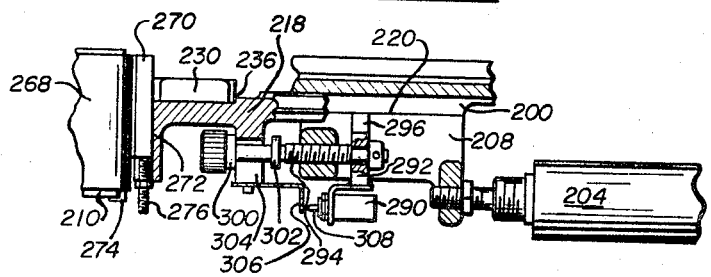
FIGURE 22 is a view taken along the line 22—22 of FIGURE 21.

Operation of the air actuated motors 226 to activate the heel clamp mechanism 212 is controlled by the aforementioned pilot valve 290 (FIGURE 22) which depends from a bar 292. The bar 292 has a hole formed therein for rotatable accommodation of the rearward end of the shaft 294. The midportion of the shaft 294 is threadably engaged with the forward end of the bracket 208 so that as the main slide plate 200 and the bracket 208 which is fixed to the main slide plate have motion, the shaft 294 and all components mounted thereto will have the same motion. A finger 296 extends upwardly from and is made integrally with the bar 292, and is contained in a longitudinal slot 298 (FIGURE 7) formed in the heel clamp slide 218. The cooperation between the finger 296 and the slot 298 prevents the bar 292 and pilot valve 290 from rotating when the shaft 294 is rotated, while permitting the bar 292 to move forwardly and rearwardly in response to rotation of the shaft 294. Formed at the forward end of the shaft 294 are spaced collars 300 and 302. A depending leg 304 which is an integral part of the heel clamp slide 218 straddles the shaft 294 at a point intermediate the collars 300 and 302. It may thus be seen that the distance that the heel clamp slide 218 and all components mounted thereto may slide with respect to the main slide plate 200 is governed by the clearance between the depending leg 304 and either of the collars 300 and 302. The stop 306 is secured to the bottom of the depending leg 304 and extends rearwardly to be in alignment with the plunger 308 of the pilot valve 290 so that as the main slide plate 200 and heel clamp slide 218 have relative motion towards each other the stop 306 will activate the plunger 308 of the pilot valve 290 which will in turn activate the heel clamp mechanism 212. When at rest the heel clamp slide 218 is maintained in a forward position with the depending leg 304 being in abutment with the collar 300 (as shown in FIGURE 22) by means of a pair of tension springs 310 (FIGURE 21) having one end connected to the bracket 208 and the other end connected to an arm 224 of the bracket 222 which is mounted to the rear of the heel clamp slide 218. In operation, the main slide plate 200 carries the heel clamp mechanism 212 forwardly, there being no relative motion between the main slide plate 200 and the heel clamp slide plate 218, until the bight 214 of the heel clamp pad 210 contacts the heel portion of the shoe assembly whereupon forward motion of the heel clamp mechanism 212 will stop and the main slide plate 200 will continue to slide forward until the collar 302 on the shaft 204 abuts the depending leg 304 of the heel clamp slide 218. The relative position of the plunger 308 of the pilot valve 290 and the stop 306 is such that the plunger 308 is depressed, thereby activating the heel clamp mechanism 212, at substantially the same time that the collar 302 abuts the depending leg 304. Rotation of the shaft 294 serves only to move the heel clamp slide 218 towards or away from the main slide plate 200, there being no change in the distance between the pilot valve 290 and the stop 306. As the heel clamp slide 218 and the heel clamp pad 210 attached thereto are drawn rearwardly towards the main slide plate 200 they are also drawn away from the shoe assembly thus permitting adjustment of the machine for accommodation of shoes of varying sizes.

To insure that the shoe assembly is rigidly supported in the machine during the above described heel clamping and subsequent operations a holddown mechanism 312 (FIGURES 1, 25, 27, and 29) is mounted to the head cover 202. The holddown mechanism 312 has a holddown foot 314 which, when in a working position is located above and in line with the pedestal 42 upon which the heel portion of the shoe assembly is supported. With the shoe assembly mounted in the machine, the toe portion of the shoe upper U is gripped by the pincers 132 and is stretched horizontally. Immediately thereafter, the motor 16 is activated to raise the post 20 and shoe supporting mechanism carried thereon so that the heel portion of the insole I is forced upwardly against the holddown foot 314 thereby rigidly clamping the last L and insole I between the pedestal 42 and the holddown foot 314. Once so rigidly clamped, the subsequent operations of stretching the upper vertically and activating the heel clamp mechanism 212, etc. may be performed with assurance that the shoe assembly will remain stationary.

The holddown mechanism 312 is so constructed that it may be horizontally withdrawn to a rearward out of the way position so as not to interfere with the initial positioning of the shoe assembly on the machine. For a purpose later described, the holddown foot 314 may be raised in a substantially vertical direction, thereby terminating its function of maintaining the shoe assembly in a rigid position. The holddown mechanism 312 consists of a holddown slide 316 which is mounted for forward and rearward sliding movement in guidaways 318 formed at the top of the head cover 202, the holddown slide 316 being retained in the guideways 318 by means of gibs 320. Formed integrally with the holddown slide are a front clevis 322, a middle clevis 324 and a rear clevis 326 (FIGURE 29). The rear clevis 326 is pinned to the piston rod 328 of an air motor 330. The air motor 330 is rigidly mounted to a bracket 332 which in turn is secured to and extends rearwardly of the head cover 202. Thus, activation of the motor 330 will cause the piston rod 328 to impart forward or rearward motion to the holddown slide 316 and all the components carried thereon. Swingably mounted to the front clevis by means of a pin 333 for motion in a vertical plane is a holddown block 334 having a vertical hole 336 formed therein. A horizontal slot 338 is also formed in the holddown block 334 and intersects the vertical hole 336. A rod 340 having its upper portion threaded and the holddown foot 314 located at its lower end is slidably contained within the vertical hole 336, the threaded portion of the rod 340 being in engagement with the knurled nut 342 which occupies the horizontal slot 338. Thus, the extent that the rod 340 and the holddown foot 314 protrude downwardly from the holddown block 334 may be varied by rotation of the nut 342. A pin 344 is secured to the holddown block 334 so that it diametrally traverses the hole 336 and cooperates with a slot 346 formed in the upper end of the rod 340 to prevent rotation of the rod 340 while the nut 342 is rotated. A ball 348 (FIGURE 29) is spring biased upwardly against the underside of the nut 342 so as to act as a detent and radial grooves 350 are formed at the underside of the nut 342 to engage the ball 348, thereby maintaining the nut 342 and consequently the rod 340 in the position desired.

An air actuated motor 352 is pivotally mounted to the rear clevis 326 and has a piston rod 354, to the forward end of which is mounted a clevis 356. The clevis 356 is part of a toggle linkage 358 which functions to cause the holddown block 334 to pivot rearwardly about the pin 333 thereby raising the holddown foot 314. The toggle linkage 358 has a pair of upper links 360 and a lower link 362, the upper links 360 being pivotally connected at one end to a rearwardly extending lug 364 which is an integral part of the holddown block 334 and pivotally connected at their other end to the clevis 356 by means of a pin 366. The lower link 362 is pivotally connected at one end to the middle clevis 324 on the holddown slide 316 and pivotally connected at its other end to the clevis 356 and the upper links 360 by means of the pin 366. It may thus be seen that operation of the motor 352 to cause the piston rod 354 to move rearwardly will impart a rearward (clockwise as seen in FIGURE 29) rotary motion to the holddown block 334 thereby raising the holddown foot 314. For the purpose of limiting and adjusting the extent that the holddown block 334 may rotate forwardly, a stop bolt 368 is threaded into the front of the holddown slide 316 so that it is in the plane of rotation of the lower link 362 whereby rotation of the lower link 362 in a counter-clockwise direction (as seen in FIGURE 29) will terminate when the lower link abuts the stop bolt 368.

Inasmuch as the performance of operations subsequent to that of the horizontal stretching of the upper is to a great extent dependent on the shoe assembly being held in a rigidly clamped position between the pedestal 42 and the holddown foot 314, a safety valve 365 having an actuating arm 367 is mounted to the top of the head cover 202. A cam 369 is mounted to the rear of the holddown slide 316 and is so arranged as to be in alignment with the actuating arm 367 of the safety valve 365 so that when the holddown slide 316 has moved forwardly to a working position, the cam 369 will trigger the actuating arm 367 thereby actuating the safety valve 365. The safety valve 365 is interposed in the pneumatic control circuit of the machine in such a manner as to preclude flow of air to all motors which power mechanisms designed to operate subsequent to the horizontal stretching of the upper until the cam 369 has triggered the actuating arm 367; i.e. when the holddown has moved forwardly to a working position.

Figure 28:
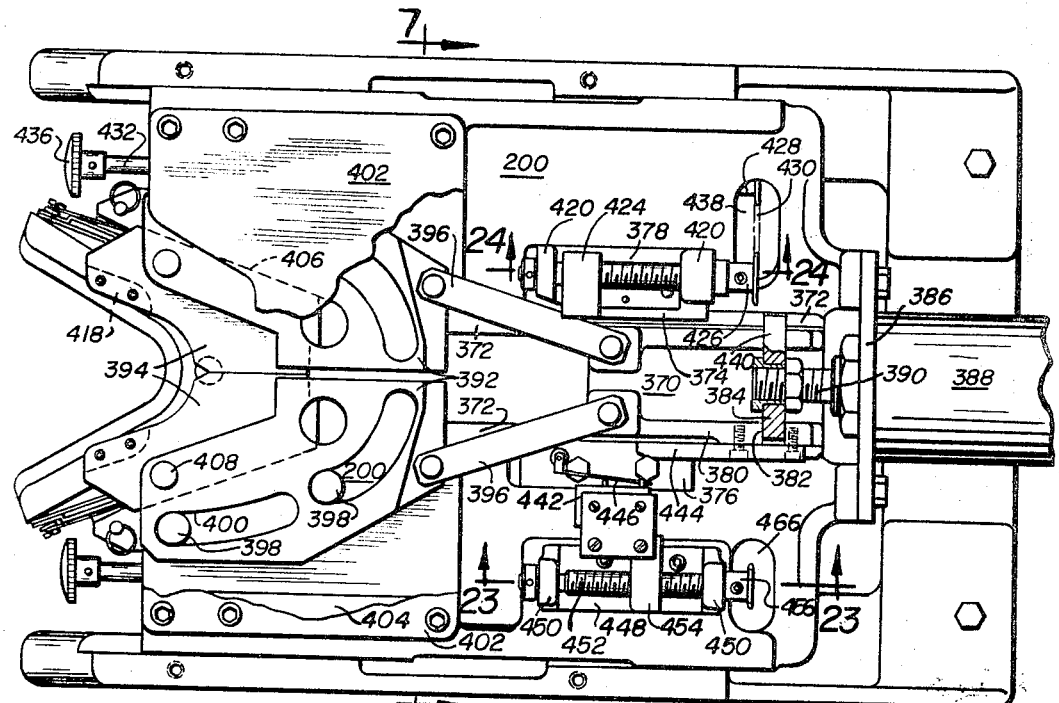
FIGURE 28 is a top view of the wipers and wiper drive.

With the shoe assembly rigidly supported between the pedestal 42 and the holddown foot 314 and the heel clamp mechanism 212 tightly pressing the upper against the last, the machine performs the operation of wiping the margin M of the upper against the insole by means of the below described mechanism. A wiper slide 370 is slidably mounted for forward and rearward movement in guideways 372 formed in the upper surface of the main slide plate 200 (FIGURE 28). The wiper slide 370 is retained in the guideways by gibs 374 and 376, the gib 374 being an integral part of the bracket 387, the function of which is later described. The wiper slide 370 has a pair of upwardly extending longitudinal walls 380, each wall having a vertical slot 382 formed therein. A connecting bar 384 rests laterally within the slots 382 and has one end protruding laterally beyond the outer surface of the wall 380 in the direction of the bracket 378. The rear of the main slide plate 200 is formed into a bracket 386 to which is mounted an air actuated motor 388 having a forwardly extending piston rod 390, the piston rod 390 being connected to the connecting bar 384 so that activation of the motor 388 will cause the wiper slide 370 and all components carried thereon to move forwardly or rearwardly in the guideways 372. Slidably mounted to the upper surface of the forward end of the main slide plate 200 are a pair of wiper cams 392 to which are mounted wipers 394. A pair of links 396 pivotally connect the wiper slide 370 and the wiper cams 392 so that motion may be transmitted to the wiper cams 392 and consequently toe wipers 394 upon actuation of the wiper slide 370 by the air motor 388. For the purpose of guiding the wiper cams 392 in a desirable predetermined path (later described in detail), rollers 398 are rotatably mounted to the main slide plate 200 and protrude upwardly into cam slots 400 formed in the wiper cams 392 for accommodation of the rollers 398. It may thus be seen that the path of motion of the wiper cams 392 and the wipers 394 will be governed by the shape of the cam slots 400. The wiper cams 392 are maintained in sliding contact with the main slide plate 200 by means of a cover 402 which is bolted to the main slide plate 200 and is spaced therefrom by means of spacers 404 (FIGURE 7), the spacing between the main slide plate 200 and the cover 402 being such that the wiper cams 392 may have horizontal sliding motion only, there being insufficient clearance for allowance of any substantial vertical movement.

The wipers 394 are mounted to the wiper cams 392 by means of horizontal slots 406 which are formed in the wiper cams 392 for accommodation of the wipers 394. Once inserted into the slots 406, the wipers 394 are retained therein by means of pins 408 which are inserted through each wiper cam 392 and each wiper 394, there being aligned holes formed in the wiper cams 392 and the wipers 394 for this purpose.

The path of motion of the wipers 394 with respect to the shoe is of importance. It has been found that the best results have been obtained when the margin M of the upper U is wiped in a direction which is normal to a line tangent to the peripheral contour of the insole I. The cam slots 400 are formed in the wiper cams 392 to cause such a motion. Thus, the shape of the came slots 400 causes the wipers 394 to initially have both a forward translatory and an inwardly swing motion. As the wiping operation progresses the forward translatory motion of the wipers 394 is decreased until it is finally terminated with the inwardly swing motion of the wipers 394 continuing after the forward translatory motion has ceased. The foregoing wiper motions are such that the initial forward translatory motion insures that there will be a substantially normal wiping action at the extreme rearward portion of the heel of the shoe and the continuing inwardly swinging motion insures a substantially normal wiping action at the more forward portions of the heel of the shoe.

For the purpose of insuring that the shoe upper conforms to the shape of the last at the breastline portion of the shoe, each wiper 394 is provided, at the bottom surface of its forward end, with a detachable plate 418 having a knurled lower surface. Thus when the forwardly translatory motion of the wipers 394 has terminated the wipers 394 will have only an inwardly swinging motion so that as the knurled plates 418 located at the forward ends of the wipers engage the margin M of the upper, the margin will be drawn inwardly so as to be further stretched about the breastline portion of the last. The advantages of the use of such a knurled plate or other device for further stretching of the breastline portion of the upper are further described in the United States application Ser. No. 294,351 filed July 11, 1963.

Figures 23, 24:
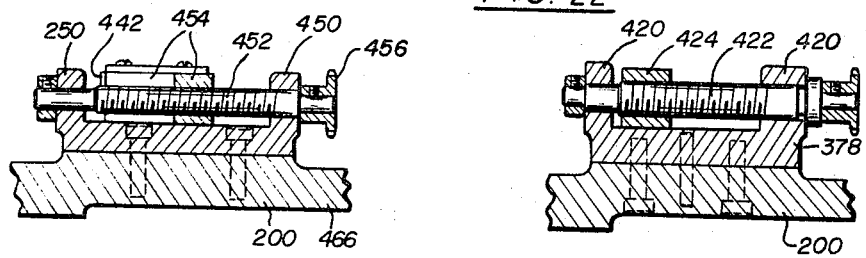
FIGURE 23 is a view taken along the line 23—23 of FIGURE 28.
FIGURE 24 is a view taken along the line 24—24 of FIGURE 28.

Means are provided for adjusting and limiting the amount of forward travel of the wiper slide 370, the effect of which is to limit the extent that the wipers 394 may be swung inwardly towards the end of the wiping stroke (see FIGURES 24 and 28). This adjustment may be made to permit the apparatus to be used with shoes of varying sizes and widths. The bracket 378 has an upwardly extending lug 420 located at each of its ends, there being a shaft 422 journaled to the lugs 420. The midportion of the shaft 422 is in threaded engagement with a nut 424 which has its lower surface in sliding and abutting contact with that portion of the bracket 378 which is intermediate the lugs 420 so that as the shaft 422 is rotated within the lugs 420, the nut 424 will be drawn forwardly or rearwardly along the shaft 422, depending on the direction of rotation of the shaft 422. Rotation of the nut 424 is precluded by means of the abutting contact made between its lower surface and the portion of the bracket 378 intermediate the lugs 420. Rotation of the shaft 422 to adjust the nut 424 is accomplished by means of a driven sprocket 426 fixed to the rear of the shaft 422. The sprocket 426 is connected to another sprocket 428 by means of an endless chain 430. The sprocket 428 is fixed to the rear of another shaft 432 (FIGURE 21) which is rotatably mounted to the underside of the main slide plate 200 by means of depending lugs 434, there being a knob 436 affixed to the forward end of the shaft 432 for facilitating rotation of the shaft 432 by the operator. A hole 438 is formed in the main slide plate 200 to permit the endless chain 430 to pass therethrough so that the sprockets 426 and 428 may be operatively connected. The nut 424 acts as an abutting member for the laterally protruding end 440 of the connecting bar 384 so that the wiper slide 370 may be moved forwardly by the motor 388 only until the protruding end 440 of the connecting bar 384 abuts the nut 424 whereupon forward motion of the wiper slide 370, and hence motion of the wiper cams 342 and wipers 394, will stop. Thus rotation of the knob 436 serves to vary the extent that the wipers 394 may rotate inwardly.

It should be noted that during the operation of the wipers 394, the insole and last are being forced upwardly against the holddown foot 314 by means of activation of the motor 16, so that the major resistance to vertical motion of the shoe assembly is provided by the holddown foot 314. When the wipers 394 have nearly completed their wiping stroke it is desirable to raise the holddown foot 314 so that it is no longer in contact with the insole for the following reasons. First, the size of the holddown foot 314 is such that it would interfere with the completion of the inwardly swinging stroke of the wipers 394. The raising of the holddown foot 314 at this point has no effect on the vertical position of the shoe assembly because the wipers 394, having already covered a substantial portion of the heel of the shoe assembly, may themselves resist the vertically upward force exerted on the shoe assembly by means of the motor 16. Second, when the wipers 394 have completed their stroke it is desirable for the wipers 394 to provide the entire resisting force in that this more firmly presses the margin M of the upper to the insole, thereby insuring a better bond between the upper and the insole. The pressure exerted on the shoe assembly by means of its direct abutment with the wipers 394 will hereinafter be referred to as bedding pressure. The raising of the holddown foot 314 is accomplished by means of the motor 352 which activates the holddown mechanism 312 as earlier described. Actuation of the motor 352 is controlled by a valve 442 (FIGURES 23 and 28) which is operatively associated with the wiper slide 370 in such a manner that when the wiper slide 370 and consequently the wipers 394 reaches a predetermined forward position, the valve 442 will trigger another valve (not shown) which allows compressed air to be introduced into the air motor 352 thereby activating it so as to raise the holddown foot 314. Mounted to one of the sidewalls 380 of the wiper slide 370 is a valve 442. The valve 442 has a lever 446 by which it is operated, the lever 446 being in alignment with the cam 444 so that as the cam 444 moves forwardly with the wiper slide 370 it will ultimately move the lever 446, thereby operating the valve 442 which will result in the raising of the holddown foot 314. The valve 442 is mounted to the main slide plate 200 for forward and rearward movement thereon, thus permitting adjustment of the distance between the lever 446 and the cam 444. The nearer the distance between the lever 446 and the cam 444, the sooner will be actuation of the motor 352 and hence the raising of the holddown foot 314. The converse is also true in that an increase in the distance between the lever 446 and the cam 444 will result in a delayed raising of the holddown foot 314.

The means by which the valve 442 is mounted to the main slide plate 200 is much the same as that of the nut 424 in that a bracket 448 (FIGURE 23) having an upwardly extending lug 450 located at each of its ends is secured to the main slide plate 200, there being a shaft 452 journaled to the lugs 450. The midportion of the shaft 452 is in threaded engagement with an L-shaped nut 454 which has its lower surface in sliding and abutting contact with that portion of the bracket 448 which is intermediate the lugs 450 so that as the shaft 452 is rotated within the lugs 450, the nut 454 will be drawn forwardly or rearwardly along the shaft 452, depending on the direction of rotation of the shaft 452. The valve 442 is mounted directly to the nut 454. Rotation of the nut 454 is prevented by means of the abutting contact made between its lower surface and the portion of the bracket 448 intermediate the lugs 450. Rotation of the shaft 452 to thus adjust the position of the valve 442 is accomplished by means of a sprocket 456 fixed to the rear of the shaft 452. The sprocket 456 is connected to another sprocket 458 (see FIGURE 21) by means of an endless chain (not shown). The sprocket 458 fixed to the rear of another shaft 460 which is rotatably mounted to the underside of the main slide plate 200 by means of depending lugs 462 (see FIGURE 21) there being a knob 464 affixed to the forward end of the shaft 460 for facilitating rotation of the shaft 460 by the operator. A hole 466 is formed in the main slide plate 200 to permit the endless chain to pass therethrough so that the sprockets 456 and 458 may be operatively connected. Thus rotation of the knob 464 acts to vary the time at which the holddown foot 314 is raised.

After wipers 394 have completed their stroke and the bedding pressure has been applied for the desired length of time, the lasting operation is complete and the various components of the machine return from their working positions to a position of rest. The return sequence is such that the post 20 and consequently the shoe supporting mechanism is the first component to be released, release of the other components following soon thereafter. The initial release of the post 20 terminates the bedding pressure and insures that the shoe will no longer be forced upwardly against the wipers 394 so that when the wipers 394 are subsequently retracted to their position of rest they will not damage the lasted margin M, of the shoe upper.

Figure 27:
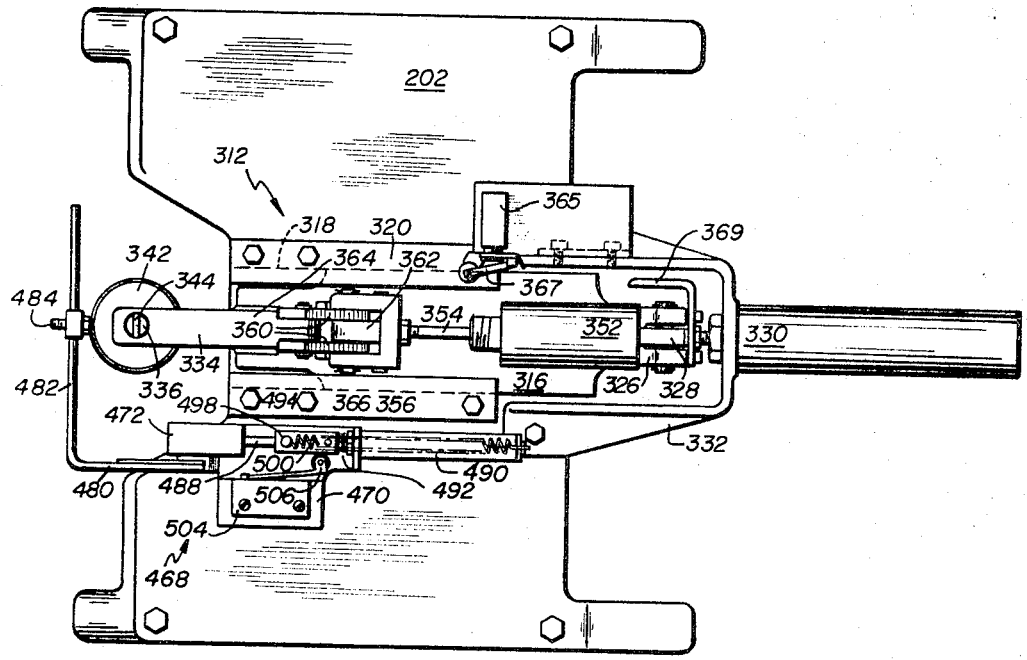
FIGURE 27 is a top view of the holddown mechanism and the gage mechanism.
Figure 36:
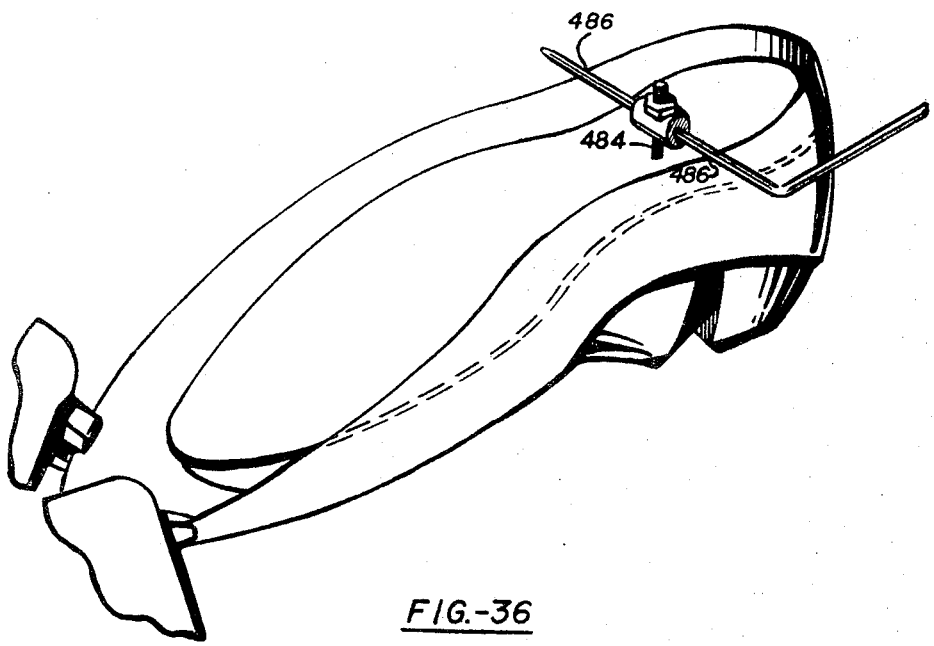
FIGURE 36 is a view of the gage in operative position with respect to the shoe assembly.

The foregoing disclosure assumed that the shoe upper U was symmetrically draped about the last L when the assembly was initially placed into the machine. Inasmuch as the orientation of the upper with respect to the last is performed manually by the operator and is therefore subject to his judgement as to when proper orientation is present, it is desirable to provide a gage mechanism 468 to aid him in his judgement. Referring to FIGURES 27 and 30, the gage mechanism 468 is supported on a bracket 470 which in turn is mounted to the top of the head cover 202. Secured to the front of the bracket 470 is an inverted U-shaped block 472 having downwardly extending spaced legs 474. A pinion gear 476 is located between the legs 474 and is rotatably mounted thereto by means of a pin 478. The pin 478 has one end thereof protruding outwardly of the block 472 and an upwardly extending arm 480 is rigidly secured to the protruding end of the pin 478 so that as the pinion gear 476 is rotated, the arm 480 will rotate with it. The arm 480 has an extension bar 482 (FIGURES 25 and 27) which extends laterally towards the center of the machine and a prong in the form of a screw 484 is mounted to the extension 482. The top screw 484 is so located on the extension 482 that it will be in substantial alignment with the centerline of the shoe when the shoe is presented to the machine. A mechanism, later described is operatively associated with the pinion gear 476 to cause it and the arm 480 to rotate about the axis of the pin 478. Referring to FIGURE 36 it may be seen that activation of the pinion gear 476 will cause the arm 480, its extension 482 and the stop screw 484 carried thereon to rotate forwardly and downwardly (counterclockwise as seen in FIGURE 30) toward the shoe assembly until the stop screw 484 abuts the insole. When the stop screw 484 is in abutment with the insole, the extension 482 to which the stop screw 848 is mounted will be parallel to the insole. The operator need then only manipulate the upper until the edge of the margin M is in contact with the extension 482 at the points 486. Thus the margin M will always extend an equal height above the level of the insole I and a symmetrically lasted shoe will result.

The pinion gear 476 is activated by means of a rack bar 488 which is located between the pinion gear 476 and the bight of the U-shaped block 472. The rearward portion of the rack 488 is operatively associated with an air actuated motor 490 mounted to the rear of the bracket 470. The air motor 490 has a piston rod 492 to which is rigidly secured a clevis 494, the legs of which extend forwardly. The rearward portion of the rack 488 is contained between the legs of the clevis 494 and is loosely secured thereto by means of cooperation between a longitudinal slot 496 formed in rack 488 and a pin 448 which is secured to the legs of the clevis 494 and is also contained within the slot 496, so that relative motion between the rack 488 and the clevis 494 is permitted in a forward and rearward direction, the extent of such motion being limited by the size of the slot 496. The rack 488 is maintained in its most forward position with respect to the clevis 494 by means of a compression spring 500 interposed between the rear end of the rack 488 and the bight of the clevis 494, the pin 498 thus being in abutment with the rearmost end of the slot 496. In operation, the air motor 490 is activated to cause the piston rod 492 and clevis 494 to move forwardly, this forward motion being imparted to the rack 488 by means of the spring 500, so that the pinion gear 476 is rotated, thereby causing the arm 480, its extension 482 and the stop screw 484 to rotate forwardly (counterclockwise as seen in FIGURE 30). Inasmuch as the foregoing gage mechanism is relatively delicate and the insole I is formed from a damageable material, it is desirable to reduce the amount of shock which occurs when the stop screw 484 is roated into abutment with the insole I. The above described mechanism has such a shock absorbing feature in that as the stop screw 484 abuts the insole, forward motion of the rack 448 will cease but the clevis 494 and piston rod 492 will continue to move forwardly, their forward motion being resisted and slowly decreased by the compression spring 500 until the forward motion of the clevis 494 is ultimately terminated by means of abutment of the pin 498 with the forward end of the longitudinal slot 496. The air motor 490 is aided in its return stroke by a tension spring 502 connected between the pin 498 and the air motor 490.

For the purpose of insuring that the arm 480 and its extension 482 are in a retracted, out-of-the-way position when the holddown mechanism 312 slides into a forward working position, a valve 504 is interposed (in a manner later described in detail) in the pneumatic circuitry between a source of compressed air and the air motor 330, the valve 504 being mechanically associated with the gage mechanism 468 as to preclude the flow of compressed air to the air motor 330 when the gage mechanism 468 is in working position. The valve 504 is mounted to the bracket 470 (see FIGURE 27) and has an actuating arm 506 which is urged against the clevis 494, the clevis 494 acting as a cam with respect to the actuating arm. When in the position shown in FIGURE 27 the gage mechanism 468 is an out of the way position, the actuating arm 506 bearing against the clevis 494, thereby causing the valve 504 to permit the flow of air to the air motor 330. When the gage mechanism 468 is in a working position, the clevis 494 will have been moved forwardly so that the actuating arm 506 bears against the piston rod 492 thereby causing the valve 504 to shut off the air supply to the air motor 330.

When the machine is in an idle position, the piston rod 18 is retracted into the motor 16 to maintain the base 26, the pedestal 42, the framework 44 and its attendant carriage 50 in a lowered position; the piston rod 56 is retracted into the motor 54 to maintain the carriage 50 in a rearward position; the piston rod 106 is retracted into the motor 104 to maintain the pincers 132 in a lowered position with respect to the carriage 60; the motors 134 are in a position to maintain the pincers 132 in an open condition; the piston rod 492 is retracted into the motor 490 to maintain the gage mechanism 468 in a non-working and an out of the way position; the piston rod 328 is retracted into the motor 330 to maintain the holddown slide 316 and its attendant holddown mechanism 312 in a rearward and out of the way position; the piston rod 354 is retracted into the motor 352 to maintain the holddown block 334 and holddown foot 314 in their most downward position; the piston rod 206 is retracted into the motor 204 to maintain the main slide plate 200 in a rearward position; the piston rods 228 are retracted into the motors 226 to maintain the heel clamp mechanism 212 in a non-working position so that the heel clamp pad 210 is in its most open condition; there is no high pressure air in the heel clamp pad 210 so that the pad is in a deflated condition; and the piston rod of motor 388 is retracted therein so that the wiper cams 392 and consequently the wipers 394 are maintained in a rearward position with respect to the main slide plate 200. With the machine in this idle condition, the various aforementioned adjustments may be made to accommodate the machine for operating on a shoe of a particular size or style.

Figure 35:
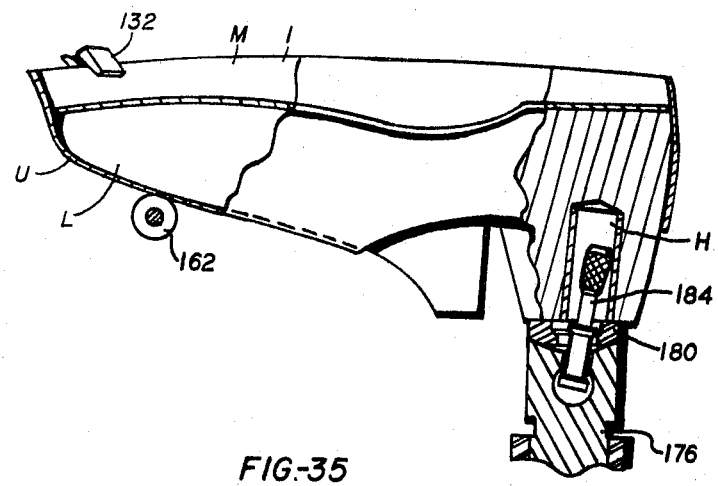
FIGURE 35 is a partially sectional view of a shoe assembly supported by the heel and toe support members.

Referring to FIGURES 35 and 37 a shoe assembly is provided which includes the last L having the insole I located at its bottom and the upper U draped about the last L, there being a conventional hole H in the last for accommodation of the last pin 184. The shoe assembly is placed bottom-up on the shoe assembly support plate 180 with the last pin 184 entering the last pin hole H in the last. The last pin hole H is shown in FIGURE 35 as being rearwardly inclined and thus improperly aligned with the last L for the purpose of illustrating the instant invention. Such a condition could arise either due to improper manufacture of the last or excessive wear as a result of frequent use of the last. The toe portion of the shoe assembly is supported on the toe rest roller 162 and the forepart portions of the upper U are inserted between the jaws of the pincers 132.

A pneumatic control circuit (not shown) is incorporated into the machine which serves to regulate the sequence of operation of the various aforementioned motors. For ease of explanation, the control circuit may be divided into three successive stages, the cycling of each stage being initiated by the shifting of three valves of a valve arrangement 600 which permit compressed air to be admitted to the stage corresponding to each valve. The instant valving arrangement is substantially identical to that fully disclosed in United States application Ser. No. 353,462 filed Mar. 20, 1964. A foot pedal 602 is operatively associated with the valves of the valve arrangement so that depression of the pedal serves to shift the valves, the number of valves shifted being dependent of the extent of depression of the pedal 602.

With the shoe assembly placed in the machine in the above described manner, the operator depresses the pedal 602 far enough to initiate the cycling of the first stage of the control circuit whereupon the motors 134 are actuated to cause the pincers 132 to grip the forepart portions of the upper margin M. At approximately the same time, the motor 490 is actuated to cause the gage mechanism 468 to be brought to a working position with the insole abutting member 484 bearing against the insole and the extension bar 482 which serves as a shoe upper abutting member located parallel to the plane of the insole I. At this point the operator may inspect the shoe assembly to determine if the pincers 132 are properly gripping the upper margin M and if the edge of the heel portion of the margin M is in abutment with the upper abutting member 482 thereby insuring that the upper margin extends a constant distance beyond the plane of the insole I. Should the upper be improperly oriented, the operator may manipulate it into proper orientation with respect to the gage. If the pincers 132 are not gripping the upper properly, he may release the pedal 602, thereby returning the machine to its idle position whereupon he may begin the first stage again.

When the operator is satisfied with the orientation of the shoe assembly he further depresses the pedal 602 to initiate the cycling of the second stage of the control circuit whereupon the motors 54 are activated to move the carriage 50 and the pincers 132 carried thereon forwardly to thereby horizontally stretch the upper in the direction of the toe and cause a taut drawing of the upper about the heel of the last. The rearward inclination of the last pin 184 prevents the last L from lifting off from the shoe assembly supporting plate 180 during the horizontal stretching of the upper U. At approximately the same time as the horizontal stretching, the motor 490 is deactivated to return the gage 468 to an out of the way position. At this point, the operator may again inspect the shoe assembly and release the pedal 602 to return the parts to their original position if the horizontal stretching of the upper is unsatisfactory.

When the operator is satisfied with condition of the workpiece in the machine, the pedal 602 is further depressed to initiate the cycling of the third and final stage of the control circuit. The third stage of the control circuit differs from the first two stages in that a plurality of motors are operated in a predetermined sequence rather than simultaneously. In the third stage, the motor 330 is activated to move the holddown mechanism 312 forwardly from its out-of-the-way position to a working position above the heel portion of the shoe bottom. Prior to this time in the machine cycle, the holddown mechanism had been in its rearward and out-of-the-way position so as not to interfere with the placement of the shoe assembly on the shoe supporting plate 180 or the operator's observation of the orientation of the upper U and whether the upper was properly stretched about the heel of the last as a result of the above described forward motion of the pincers 132. In addition it is to be noted that inasmuch as the gage 468 and holddown foot 314 perform their respective functions on the same portion of the shoe assembly (i.e., the heel portion of the insole), they necessarily have interfering paths of movement. To prevent any such mechanical interference the valve 504 is interposed in the control circuit in such a manner as to prevent the flow of compressed air to the motor 330 while the gage mechanism 468 is in a working position, the actuating arm 506 of the valve 504 bearing against the piston rod 492 of the motor 490 (see FIGURE 27). When the gage mechanism 468 is in a non-working and out-of-the-way position, the actuating arm 506 bears against the clevis 494, thereby causing the actuating arm 506 to shift the valve 504 to permit air to flow to the motor 330, and thus impart forward motion to the holddown mechanism 312. Such a safety measure is ordinarily unnecessary when the operator waits for one stage to be completed before depressing the pedal 602 to activate the next stage, however, it has been found that the operators frequently do not possess such patience and consequently fully depress the pedal 602 to the third stage with a minimum of delay, thus necessitating such a safety measure.

With the holddown foot 314 in position over the heel portion of the shoe assembly, the motor 16 is actuated to thereby raise the post 20, the platform 26 and all members mounted to the platform 26, including the shoe assembly, so that the heel portion of the shoe assembly may be rigidly clamped between the pedestal 42 and the holddown foot 314. The elevation of the holddown foot 314 had been previously adjusted by means of the knurled nut 342 to position the bottom of the holddown foot 314 slightly below the level of the bottom surface of the wipers 394 so that the raising of the shoe assembly by the actuation of the motor 16 brings the insole to this level regardless of the height of the last L or the thickness of the insole I.

Figure 32:
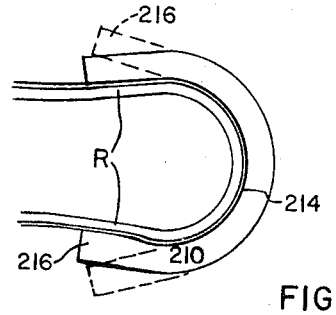
FIGURE 32 is a plan view of the heel of the shoe as it is engaged by the heel clamp pad.

When the shoe assembly is thus firmly clamped between the pedestal 42 and holddown foot 314 the control circuit causes the motor 204 to be activated to move the main slide plate 200 to a forward working position and thereby carry the heel clamping mechanism 212 and the wipers 394 forwardly from their out-of-the-way position until the bight 214 of the heel clamp pad 210 abuts the heel end of the shoe assembly as shown in dotted lines in FIGURE 32, thereby terminating forward motion of the heel clamp mechanism 212. The main slide plate 200 and the wipers 394 carried thereon continue to move forwardly until the collar 302 on the shaft 294 abuts the depending leg 304 of the heel clamp slide 218 (see FIGURE 22). Simultaneously with the abutment of the collar 302 and the depending leg 304, the plunger 308 of the pilot valve 290 is depressed by reason its abutment with the stop 306 to thereby actuate the pilot valve 290. The pilot valve 290 controls the activation of the valve 211 (see FIGURE 34) to block the return flow of oil from the motor 204 to thereby lock the main slide plate 200 in its forward position and also controls actuation of the motor 226 which operate the heel clamp mechanism 212.

The main slide plate 200 together with its attendant heel clamp 210 and wipers 394 had been in a retracted out-of-the-way position up to this time so as to enable the operator to inspect the shoe assembly without interference therefrom during the gripping of the upper margin M by the pincers 132, the horizontal stretching movement of the pincers 132 as well as providing a maximum amount of space for manipulation of the upper into proper orientation in conjunction with the gage 468. In addition, the maintenance of the heel clamp and wipers in their out-of-the-way position enables the motor 16 to raise the shoe assembly without interference thereon. By having the heel clamp pad abut the heel end of the shoe assembly and thereby terminating its forward movement before forward motion of the main slide plate 200 terminates, it is assured that the heel clamp will be properly positioned adjacent the shoe assembly in preparation for the subsequent heel clamping operation, regardless of the location of the heel end of the shoe assembly.

Simultaneously with the actuation of the motor 204 to move the main slide plate 200 forward, the motor 104 is actuated to move the pincers 132 vertically and thus apply an upward tension to the upper margin at its forepart positions to thereby stretch the upper tightly on the last and assemble it in proper position for the subsequent heel seat lasting operation. Since the shoe assembly is clamped at this time between the pedestal 42 and the holddown foot 314, upward movement of the pincers 132 will not shift the last L. It should be noted that although the motors 204 and 104 are actuated simultaneously, the motor 204 reacts slower than the motor 104 due to the fact that the motor 104 is powered by compressed air whereon the motor 204 is powered by oil under pressure which is considerably more viscous than air and hence flows at a slower rate. Thus, the motor 104 will cause the pincers 132 to be raised vertically to stretch the upper as aforementioned before the main slide plate 200 and the mechanism carried thereon are fully moved to a forward position by the motor 204.

When the main slide plate 200 has moved to its most forward position and the pilot valve 290 has been activated, the motors 226 are then activated to operate the heel clamp mechanism 212 as aforementioned so that the legs 216 of the heel clamp pad 210 are initially stretched forwardly towards the toe of the shoe assembly and are subsequently swung inwardly towards the sides of the shoe assembly (as shown in FIGURE 32) to cause all of the inner wall of the pad 210 to engage the heel of the shoe assembly. Concomitantly with the actuation of the motors 226 compressed air is introduced into the hollow interior of the heel clamp pad 210 to inflate the pad and cause it to press more firmly against the upper. By first engaging the bight 214 of the pad 210 with the heel of the shoe assembly, then stretching the pad legs 216 and then urging the pad legs inwardly towards the shoe assembly, a progressive engagement of the pad legs and the shoe upper is provided which causes a smoothening out of any wrinkles that may have been present in the upper and a firm clamping of the upper against the last.

When the shoe has been clamped by the heel pad 210 the motor 388 is activated to cause the wiper slide 370 to move forwardly, thereby imparting motion to the wiper cams 392 and consequently the wipers 394 by means of the links 396. The wipers 394 are guided in their movement by means of the engagement of slots 400 in the wiper cams 392 with the rollers 398 which are rotatably mounted to and protrude upwardly from the main slide plate 200 into the slots 400. The slots 400 are so shaped that the wipers 394 will have an initial motion that is both forwardly translating and inwardly swinging and a subsequent motion that is solely inwardly swinging, the forwardly translating motion having then been terminated. Such a motion is operative to cause the wipers 394 to progressively engage the upper margin from the heel end of the shoe towards the toe end in such a manner that when the wipers 394 initially contact a portion of the upper margin M they will wipe the margin against the insole I in a direction which is substantially perpendicular to a line drawn tangent to the periphery of the insole I, thereby preventing toeward stretching of the upper during the wiping operation and insuring an evenly lasted shoe.

As the wipers 394 progress towards the completion of their stroke, the knurled plates 418 located at the forward ends of the wipers 394 engage the upper margin M to urge the margin inwardly and thereby further stretch the upper about the breastline portion of the last. When the resistance of the upper is such that it can no longer be stretched by means of the knurled plates 418, the plates 418 and wipers 394 slide along the surface of the margin to complete their inward movement.

The control circuit is so constructed as to cause the motors 134 to return to their position when the knurled plates 418, the plates 418 and wipers 394 slide along the surface of the margin to complete their inward movement.

The control circuit is so constructed as to cause the motors 134 to return to their position when the knurled plates 418 engage the upper margin M, thereby opening the pincers 132 so that they may release their grip on the upper. Release of the grip of the pincers 132 at this time aids the stretching action of the knurled plates 418 in that the knurled plates 418 do not have to overcome the stretching forces on the upper applied by the pincers 132. The tight stretching of the upper about the last that had been provided by the pincers is taken over and maintained by the engagement of the knurled plates 418 with the upper.

To accommodate shoes of varying widths, the extent which the wipers may be swung inwardly under the influence of the motor 388 is made variable by means of the stop 424 (FIGURE 28) which can be adjusted to vary the extent of forward motion of the wiper slide 370, thereby adjusting the amount of the inward stroke of the wipers 394.

At or near the completion of the stroke of the 394 the control cicuit causes simultaneous actuation of the motor 352 and introduction into the motor 16 of air under a higher pressure than heretofore been employed. Thus increasing the upward force of the pedestal 42 on the shoe assembly and so producing the bedding pressure necessary to insure a complete and permanent bond between the upper margin and the insole. Actuation of the motor 352 serves to raise the holddown foot 314 from the last so that the entire resistance to upward movement of the shoe is provided by the wipers 394 alone, this resistance to upward force causing the margin M of the upper to be firmly pressed to the insole. The bedding pressure is maintained for a predetermined time sufficient to insure a permanent bond between the upper margin and the insole. The time at which the holddown foot 314 is raised and the bedding pressure is applied is to a large extent dependent on the type of material of which the upper U is composed. If the upper is made from a relatively soft, weak material the raising of the holddown foot 314 prior to completion of the wiper stroke so that the entire upward force of the motor 16 is resisted by the wipers 194 may result in tearing of the upper due to the continued inward motion of the wipers, whereas if the upper is formed from a relatively tough and tear resistant material, the holddown foot 314 may be raised before the wipers 394 have fully completed their stroke. The timing may be accordingly adjusted by means of a valve 442 which is interposed in the control circuitry so as to normally preclude the flow of air to the motor 352 and is actuable in response to the forward position of the wiper slide 370 thereby correlating the application of bedding pressure with the progression of the wiper stroke. As earlier described, the valve 442 may be adjustably moved towards or away from the wiper slide 310 thereby permitting the application of bedding pressure to be varied from a relatively early time in the wiper stroke to a relatively late time in the wiper stroke or after the wiper stroke has been completed.

When the bedding pressure has been applied for a sufficient length of time, the control circuit causes all of the parts that have not yet done so, to return to their idle position in readiness for another complete cycle.

While the illustrative embodiment of the invention is a machine for ultimately heel seat lasting a shoe assembly, certain facets of the invention have wider utility and therefore have not been limited in the appended claims to ultility in such a machine.

I claim:
1. Gage means for use in orienting material with respect to the surface in such a manner that said material has a marginal portion extending a prescribed distance beyond said surface comprising:
  a bar mounted for movement towards said surface; and
  a prong mounted to said bar and being so constructed and arranged as to extend towards said surface when said bar is moved towards said surface whereby said motion may bring said prong to bear against said surface, said prong being of such dimensions as to cause said bar to be spaced, by said prescribed distance, from said surface whereby said marginal portion may be brought into abutment with said bar thereby causing said marginal portion to extend beyond said surface an amount corresponding to said prescribed distance.

2. A gaging device, for use with a shoe assembly that includes a last having an upper draped thereon and an insole located on its bottom to orient a selected portion of the margin of the upper so that it extends a prescribed distance away from the insole, comprising:
  a support for supporting the shoe assembly bottom-up;
  a gage located above the support;
  means mounting the gage for movement from a first postion wherein the gage is remote from the shoe assembly to a second position wherein the gage is in engagement with the shoe assembly;
  an insole abutting member on said gage adapted to bear against the insole when the gage is in said second position; and
  an upper abutting member on said gage that is offset from and spaced above said insole abutting member by said prescribed distance when the gage is in said second position; whereby said margin portion may be manipulated, while the gage is in said second position, to bring said margin portion into engagement with said upper abutting member.

3. A gaging device, for use with a shoe assembly that includes a last having an upper draped thereon and an insole located on its bottom to orient spaced segments of a selected portion of the margin of the upper so that they extend a prescribed distance away from the insole, comprising:
  a support for supporting the shoe assembly bottom-up;
  a gage located above the support;
  means mounting the gage for movement from a first position wherein the gage is remote from the shoe assembly to a second position wherein the gage is in engagement with the shoe assembly;
  a prong on said gage adapted to bear against the insole when the gage is in said second position; and
  a bar attached to the prong having upper abutting segments located on opposed sides of the prong and spaced above the prong by said prescribed distance when the gage is in said second position; whereby said margin segments may be manipulated, while the gage is in said second position, to bring said margin segments into engagement with said upper abutting segments.

4. A gaging device, for use with a shoe assembly that includes a last having an upper draped thereon and an insole located on its bottom to orient spaced segments of a selected portion of the margin of an upper so that they extend a prescribed distance away from the insole, comprising:
  a support for supporting shoe assembly bottom-up;
  a gage bar located above the support having bar segments that are spaced a distance that corresponds to the distance between said upper margin segments;
  a prong connected to the gage bar intermediate said bar segments that extends away from the segments by said prescribed distance;
  means mounting the gage bar for movement from a first position wherein the gage is remote from the shoe assembly to a second position wherein the prong is in engagement with the insole and the bar segments are spaced above the insole by said prescribed distance; and
  drive means for moving the bar from said first position to said second position.

5. The device as defined in claim 2 further comprising:
  a drive bar mounted for movement from a first position to a second position;

means connecting the drive bar to the gage so constructed and arranged as to move the gage from its first to its second position in response to movement of the drive bar from its first to its second position;

a drive means for effecting said movement of the drive bar; and a yieldable connection between the drive means and the drive bar to minimize shock caused by engagement of the insole abutting member with the insole when the gage is moved into its second position.

6. An apparatus for wiping a selected portion of the margin of a shoe upper against the corresponding portion of a shoe insole while said margin portion is oriented to extend a prescribed amount above the insole comprising:

wiping means mounted for movement in a wiping stroke from a retracted to an advanced position;

means for initially maintaining the wiping means in its retracted position;

a support for supporting bottom-up a shoe assembly that includes a last having the upper mounted thereon and the insole located on its bottom with said portion of the upper facing the wiping means;

a gage located above the support and mounted for movement in a first prescribed path between a first position remote from the shoe assembly and a second position juxtaposed to the shoe assembly, said gage being so constructed and arranged as to enable said upper margin portion to be oriented when the gage is in said second position;

means for initially maintaining the gage in said first position;

a holddown mounted for movement from an out-of-the-way position remote from the shoe assembly to a working position above the insole in a second prescribed path that bears an interfering relation with the first prescribed path;

means for initially maintaining the holddown in its out-of-the-way position;

first drive means connected to the gage that is initially actuable to move the gage from said first position to said second position and is subsequently actuable to move the gage back to said first position;

second drive means connected to said holddown and actuable to move it from said out-of-the-way position to said working position;

means for actuating the first drive means to move the gage as aforesaid whereby said margin portion is oriented while the gage is in said second position;

means for thereafter actuating said second drive means to move the holddown to its working position;

means for thereafter imparting relative closing movement between the support and the holddown to clamp the shoe assembly therebetween;

means for thereafter imparting a wiping stroke to the wiping means to wipe said margin portion against said insole portion; and safety means operatively connected to said first and second drive means so constructed and arranged as to preclude actuation of the second drive means until the first drive means has caused the gage to move from said second position out of interfering relation with said second prescribed path.

7. An apparatus for wiping a selected portion of the margin of a shoe upper against the corresponding portion of a shoe insole while said margin portion is oriented to extend a prescribed amount above the insole comprising:

wiping means mounted for movement in a wiping stroke from a retracted to an advanced position;

means for initially maintaining the wiping means in its retracted position;

a support for supporting bottom-up a shoe assembly that includes a last having the upper mounted thereon and the insole located at its bottom with said portion of the upper facing the wiping means;

a gage located above the support and mounted for movement in a first prescribed path between a first position remote from the shoe assembly and a second position juxtaposed to the shoe assembly, said gage being so constructed and arranged as to enable said upper margin portion to be oriented when the gage is in said second position;

means for initially maintaining the gage in said first position;

a hold-down mounted for movement from an out-of-the-way position remote from the shoe assembly to a working position above the insole in a second prescribed path that bears an interfering relation with the first prescribed path;

means for initially maintaining the hold-down in its out-of-the-way position;

first drive means connected to the gage that is initially actuable to move the gage from said first position to said second position and is subsequently actuable to move the gage back to said first position;

second drive means connected to said hold-down and actuable to move it from said out-of-the-way position to said working position;

a source of power;

control means actuable to enable power to be transmitted from said source of power to said second drive means to thereby actuate said second drive means;

a safety device interposed between said control means and said second drive means so constructed and arranged as to permit said transmission of power when in a first position and to preclude said transmission of power when in a second position;

shifting means mounted for movement with the gage so constructed and arranged as to maintain the safety device in its second position when the gage is in its second position and to cause the safety device to shift to its first position when the gage has moved from its second position out of intersecting relation with said second prescribed path;

means for actuating the first drive means to move the gage as aforesaid whereby said margin portion is oriented while the gage is in said second position;

means for thereafter actuating said control means to thereby actuate said second drive means to move the hold-down to its working position provided the safety device is in its first position;

means for thereafter imparting relative closing movement between the support and the hold-down to clamp the shoe assembly therebetween; and means for thereafter imparting a wiping stroke to the wiping means to wipe said margin portion against said insole portion.

8. An apparatus for wiping a selected portion of the margin of a shoe upper against the corresponding portion of a shoe insole while said portion is oriented to extend a prescribed amount above the insole comprising:

wiping means mounted for movement in a wiping stroke from a retracted to an advanced position;

means for initially maintaining the wiping means in its retracted position;

a support for supporting bottom-up a shoe assembly that includes a last having the upper mounted thereon and the insole located on its bottom with said portion of the upper facing the wiping means;

a gage located above the support and mounted for movement in a first prescribed path between a first position remote from the shoe assembly and a second position juxtaposed to the shoe assembly, said gage being so constructed and arranged as to enable said upper margin portion to be oriented when the gage is in said second position;

means for initially maintaining the gage in said first position;

a hold-down mounted for movement from an out-ofthe-way position remote from the shoe assembly to a working position above the insole in a second prescribed path that bears an intersecting relation with the first prescribed path;

means for initially maintaining the hold-down it its out-of-the-way position;

a first fluid actuated motor connected to the gage that is initially actuable to move the gage from said first position to said second position and is subsequently actuable to move the gage back to said first position;

a second fluid actuated motor connected to the hold-down and actuable to move it from said out-of-the-way position to said working position;

a source of fluid under pressure;

a control valve actuable to enable fluid under pressure to be transmitted from said source to thereby actuate said second motor;

a safety valve interposed between said control valve and said second motor so constructed and arranged as to permit said transmission of fluid when in a first position and to preclude said transmission of fluid when in a second position;

a valve shifting cam mounted for movement with the gage so constructed and arranged as to maintain the safety valve in its second position when the gage is in its second position and to cause the safety valve to shift to its first position when the gage moved from its second position out of intersecting relation with said second prescribed path;

means for actuating the first motor to move the gage as aforesaid whereby said margin portion is oriented while the gage is in said second position;

means for thereafter actuating said control valve to thereby actuate said second motor to move the hold-down to its working position provided the safety valve is in its first position;

means for thereafter imparting relative closing movement between the support and the hold-down to clamp the shoe assembly therebetween; and means for thereafter imparting a wiping stroke to the wiping means to wipe said margin portion against said insole portion.

9. A shoe machine having:

support means for supporting, bottom-up, a last having a last pin hole formed therein and a shoe upper draped thereabout;

gripping means operative to grip said upper; and means for moving said gripping means away from the heel portion of said last in a direction having a horizontally forward component;

said support means comprising:

a last pin having a portion receivable in said last pin hole, the entire axis of said last pin portion being inclined upwardly and rearwardly whereby said last is precluded from upward movement with respect to said last pin upon the aforesaid movement of said gripping means.

10. A shoe machine having:

support means for supporting, bottom-up, a last having a last pin hole formed therein and a shoe upper draped thereabout;

gripping means operative to grip said upper; and means for moving said gripping means away from the heel portion of said last in a direction having a horizontally forward component to thereby horizontally stretch said upper about the heel portion of said last;

said support means comprising:

a last pin having its uppermost portion receivable in said last pin hole and being so constructed and arranged as to have the entire axis of said uppermost portion projecting rearwardly of the remainder of said last pin whereby said last is precluded from upward movement with respect to said last pin upon the aforesaid movement of said gripping means.

11. A shoe machine comprising:

support means for supporting the cone of a last having a last pin hole formed therein and a shoe upper draped thereabout;

gripping means operative to grip said upper;

means for moving said gripping means away from the heel portion of said last in a direction having a horizontally forward component to thereby stretch said upper about the heel portion of said last; and a last pin receivable in said last pin hole, said last pin being mounted to said support means with its entire axis extending upwardly from and rearwardly of said support means, whereby the cone of said last may remain in a supported condition by said support means upon the aforementioned movement of said gripping means.

12. A shoe machine for performing operations on a shoe assembly which includes a last having a last pin hole formed therein and a shoe upper draped thereabout comprising:

a pedestal having a concave upper surface;

a shoe assembly supporting plate located on said pedestal and having a convex lower surface in mating cooperation with the upper surface of said pedestal so that said shoe assembly supporting plate may rock upon the upper concave surface of said pedestal, thereby permitting said shoe assembly supporting plate to accommodate itself to support the cone of said last, said shoe assembly supporting plate having a hole formed therethrough;

gripping means operative to grip said upper;

means for moving said gripping means away from the heel portion of said shoe assembly in a direction having a horizontally forward component to thereby stretch said upper about the heel portion of said last; and a last pin, receivable in said last pin hole, said last pin being mounted to and extending upwardly from and rearwardly of said pedestal and protruding through the hole in said shoe assembly supporting plate, said hole being of greater size than that of said last pin to permit said rocking motion of said shoe assembly supporting plate without interference from said last pin, whereby the cone of said last may remain in a supported condition by said shoe assembly supporting plate upon the afore-mentioned movement of said gripping means.

13. A shoe machine for performing operations on a shoe assembly which includes a last having a last pin hole formed therein and a shoe upper draped thereabout comprising:

a pedestal having a slot formed laterally therethrough and intersecting the upper surface of said pedestal;

a shoe assembly supporting plate seated on said pedestal and movable thereon so as to become accommodating to the cone of said last upon placement of the last upon said supporting plate, said supporting plate having a hole formed therein;

gripping means operative to grip said upper;

means for moving said gripping means away from the heel portion of said shoe assembly in a direction having a horizontally forward component to thereby stretch said upper about the heel portion of said last;

a last pin contained within said slot and extending upwardly and rearwardly from said pedestal and through the hole in said supporting plate, said hole being of greater dimensions than said last pin so as to permit said movement of said supporting plate on said pedestal without interference from said last pin;

first restraining means, so constructed and arranged as to preclude removal of said last pin from said slot in an upward direction; and second restraining means, so constructed and arranged as to preclude removal of said supporting plate from said last pin in an upward direction.

14. A shoe machine for performing operations on a shoe assembly which includes a last having a last pin hole formed therein and a shoe upper draped thereabout comprising:
- a pedestal having a concave, cylindrical upper surface and a first slot extending downwardly from said upper surface and formed laterally therethrough, said slot having an upper portion and a lower portion of greater width than said upper portion, thereby defining a restriction at the junction of said upper and lower portions, said upper portion being rearwardly inclined;
- a shoe assembly supporting plate located on said pedestal and having a convex lower cylindrical surface complementary to the upper surface of said pedestal so that said shoe assembly supporting plate may slidably rock thereupon in a forward-rearward direction and may slide thereupon in a lateral direction, thereby permitting said shoe assembly supporting plate to accommodate itself to support the cone of said last, said shoe assembly supporting plate having a second slot formed therethrough, said second slot having its greatest dimension aligned in a forward-rearward direction;
- a shoulder located along the inner periphery of said second slot;
- a last pin, the upper portion of which is receivable in said last pin hole and having an upper collar and and a lower collar, said upper collar being spaced from said lower collar and being of greater size than both said lower collar and the shoulder in said second slot;
- said lower collar being of greater size than said restriction whereby said last pin, shoe assembly supporting plate and pedestal may be assembled so that said shoe assembly supporting plate is seated on the upper surface of said pedestal, said last pin depending through said second slot and in said first slot and being supported by engagement of said upper collar and the shoulder of said second slot, said lower collar being contained within the lower portion of said first slot thereby precluding the lifting of said shoe assembly supporting plate with respect to said last pin by means of cooperation between said upper collar and said shoulder and precluding the lifting of said last pin with respect to said pedestal by means of cooperation between said lower collar and said restriction, the upper portion of said first slot being inclined rearwardly and upwardly and having a width corresponding to that portion of said last pin which is intermediate said collars and depends into said first slot whereby the inclination of the upper portion of said slot may guide said last pin so that it extends in an upward and rearward direction;
- gripping means operative to grip said upper; and
- means for moving said gripping means away from the heel portion of said shoe assembly in a direction having a horizontally forward component to thereby stretch said upper about the heel portion of said last.

15. An apparatus as recited in claim 14 further comprising:
- an upwardly extending shoulder located at each lateral extremity of the upper surface of said pedestal whereby said shoe assembly supporting plate may be contained in its laterally sliding motion between said upwardly extending shoulders;
- and wherein said collars are sufficiently spaced on said last pin to permit said shoe assembly supporting plate and said last pin to be lifted in unison to a height sufficient to permit the bottom surface of said shoe assembly supporting plate to be at a level that is above the uppermost end of said upwardly extending shoulders, thereby permitting the lateral removal of said shoe assembly supporting plate and said last pin from said pedestal.

16. An apparatus for clamping the heel portion of a shoe upper to a rigidly supported last comprising:
- a support member;
- a pair of laterally extending and opposed arms pivotally mounted to said support member at pivot points for motion in a horizontal plane;
- a pair of links having one end of each thereof extending forwardly towards said last;
- drive means, connected to said links to impart a force thereto in the direction of said last;
- connecting means connecting said links to said arms and being so constructed and arranged as to guide said links in response to actuation of said drive means so that the forwardly extending ends thereof initially have motion which is substantially rectilinearly forward and subsequently have rotary motion about said pivot points to cause said forwardly extending ends to swing inwardly towards each other;
- a heel clamp pad having a bight and a pair of legs extending forwardly of and diverging from said bight; and
- means connecting the legs of said heel clamp pad to the forwardly extending ends of said links so as to partake of the motion of the ends of said links.

17. An apparatus for clamping the heel portion of a shoe upper to a rigidly supported last comprising:
- a support member;
- a pair of laterally extending and opposed arms pivotally mounted to said support member at first pivot points for motion in a horizontal plane;
- bias means, associated with said arms to urge the lateral extremities thereof to rotate rearwardly;
- first abutting means located on said support member and operative to limit the extent of rearward rotation to said arms;
- a pin mounted to the outer extremity of each of said arms;
- a first pair of links each of which have one end thereof pivotally associated with said support member for rotation in a horizontal plane in a direction which is towards and away from each of said arms;
- drive means operatively connected to the other end of said first links at a second pivot point, for imparting a forward motion to said second pivot point to thereby rotate said first links towards said arm;
- a second forwardly extending link, pivotally mounted to said first link at said second pivot point and having a slot formed therein forwardly of said second pivot point for accommodation of said pin, said slot cooperating with said pin to form a lost motion connection therewith, said slot being of such shape as to guide said second link so that the most forward end of said second link may define a substantially forward linear path in response to rotation of said first link towards said arm, said substantially forward linear motion being terminable no later than upon abutment of the rear end of said slot with said pin whereupon said arms, and said first and second links may form a pair of rigid units so that continued operation of said drive means may cause said rigid units to rotate about said first pivot points thereby causing the most forward ends of said second links to swing inwardly towards each other;
- a heel clamp having a bight and a pair of legs extending forwardly of and diverging from said bight; and
- means connecting the legs of said heel clamp pad to the forwardly extending ends of said second links so as to partake of the motion of the ends of said second links.

18. An apparatus recited in claim 17 further comprising:
second abutting means mounted to each of said arms and extending towards said first link, said second abutting means being located in the same horizontal plane of rotation as said first link whereby said first link may, upon rotation towards said second abutting means, come into abutment therewith before the rear end of the slot in said second link abuts said pin, thereby causing termination of the substantially forward linear motion of said second link and commencement of the inward swinging motion of the forward ends of said second links at an earlier time; and
means for varying the extent which said second abutting means extends towards said first link.

19. An apparatus for clamping the heel portion of a shoe upper to a rigidly supported last comprising:
a support member;
a pair of laterally extending and opposed arms pivotally mounted to said support member at first pivot points for motion in a horizontal plane;
bias means associated with said arms to urge the lateral extremities thereof to rotate rearwardly;
first abutting means located on said support member and operative to limit the extent of rearward rotation of said arms;
a pin mounted to the outer extremity of each of said arms;
a first link having one end thereof pivotally mounted to each arm at a second pivot point for rotation in a horizontal plane, said second pivot point being located intermediate said pin and said first pivot point;
drive means, operatively connected to the other end of said first links at a third pivot point, for imparting a substantially forward motion to said third pivot point to thereby rotate said first link towards said arm;
a second, forwardly exending link, pivotally mounted to said first link at said third pivot point and having a slot formed therein forwardly of said third pivot point for accommodation of said pin, said slot cooperating with said pin to form a lost motion connection therewith, said slot being of such shape as to guide said second link so that the most forward end of said second link may define a substantially forward linear path in response to rotation of said first link towards said arm, said substantially forward linear motion being terminable upon abutment of the rear end of said slot with said pin whereupon said arms, and said first and second links may form a pair of rigid units so that continued operation of said drive means may cause said rigid units to rotate about said first pivot points thereby causing the most forward ends of said second links to swing inwardly toward each other;
a heel clamp pad having a bight and a pair of legs extending forwardly of and diverging from said bight; and
means connecting the legs of said heel clamp pad to the forwardly extending ends of said second links so as to partake of the motion of the ends of said second links.

20. An apparatus as recited in claim 19 further comprising:
second abutting means mounted to each of said arms and extending towards said first link, said second abutting means being located in the same horizontal plane of rotation as said first link whereby said first link may, upon rotation towards said second abutting means, come into abutment therewith before the rear end of the slot in said second link abuts said pin, thereby causing termination of the substantially forward linear motion of said second link and commencement of the inward swing motion of the forward ends of said second links at an earlier time; and
means for varying the extent which said second abutting means extends towards said first link.

21. An apparatus for clamping the heel portion of a shoe upper to a rigidly supported last comprising:
a support member;
a pair of laterally extending and opposed arms pivotally mounted to said support member at first pivot points for motion in a horizontal plane;
bias means associated with said arms to urge the outer extremities thereof rearwardly;
first abutting means located on said support member and operative to limit the extent of rearward rotation of said arms;
a pin mounted to the outer extremity of each of said arms;
a first link having one end thereof pivotally mounted to each arm at a second point for rotation in a horizontal plane, said second point being located intermediate said pin and said first pivot point;
a second forwardly extending link pivotally mounted to the other end of each of said first links at a third pivot point and having a forward-rearward slot formed therein intermediate its ends for accommodation of said pin, said slot cooperating with said pin to form a lost-motion connection therebetween in a substantially forward-rearward direction, the lateral distance between said second pivot point and said third pivot point being substantially equal to the lateral distance between said second pivot point and said pin, whereby rotation of said first links about said second pivot points may impart a substantially forward motion to said second links until the rear end of said slots abut said pins whereupon said arms, said first links and said second links may form a pair of rigid units so that a continued forward force applied at said third pivot points may cause said arms, and said first and second links to rotate, as rigid units about said first pivot points thereby causing the most forward ends of said second links to swing inwardly towards each other;
a heel clamp pad having a bight and a pair of legs extending forwardly of and diverging from said bight;
means connecting the legs of said heel clamp pad to the forwardly extending ends of said second links so as to partake of the motion of the ends of said second links; and
motor means for imparting a forward motion to said third pivot points.

22. An apparatus as recited in claim 21 further comprising:
second abutting means mounted to each of said arms and extending towards said first link, said second abutting means being located in the same horizontal plane of rotation as said first link whereby said first link may, upon rotation towards said second abutting means, come into abutment therewith before the rear of the slot in said second link abuts said pin, thereby causing termination of the substantially forward linear motion of said second link and commencement of the inward swinging motion of the forward ends of said second links at an earlier time; and
means for varying the extent which said second abutting means extends towards said first link.

23. An apparatus as recited in claim 17 wherein said pins extend vertically into the slots of said second links, said slots being so constructed and arranged as to permit such vertical accommodation.

24. An apparatus as recited in claim 21 wherein said pins extend vertically into the slots of said second links, said slots being so constructed and arranged as to permit such vertical accommodation.

(References on following page)

References Cited

UNITED STATES PATENTS

| | | | |
|---|---|---|---|
| 1,030,519 | 6/1912 | Macleod | 12—14.4 |
| 1,108,100 | 8/1914 | Brock | 12—14.4 |
| 1,719,279 | 7/1929 | Shlieler | 12—141 |
| 1,762,720 | 6/1930 | Kilburn et al. | 12—126 |
| 2,781,008 | 2/1957 | Nielsen | 112—151 |
| 3,115,649 | 12/1963 | Kamborian et al. | 12—14.4 |
| 3,120,014 | 2/1964 | Kamborian et al. | 12—126 |
| 3,308,495 | 3/1967 | Simmods | 12—127 |

PATRICK D. LAWSON, *Primary Examiner.*

U.S. Cl. X.R.

12—126